United States Patent
Sakurai et al.

(10) Patent No.: US 6,920,276 B2
(45) Date of Patent: Jul. 19, 2005

(54) OPTICAL FIBER ASSEMBLY HAVING HERMETIC SEAL PORTION AND METHOD FOR MAKING THE SAME

(75) Inventors: Tsutomu Sakurai, Matsudo (JP); Naotoshi Shiokawa, Kamagaya (JP)

(73) Assignee: Seikoh Giken Co., Ltd. (JP)

( * ) Notice: Subject to any disclaimer, the term of this patent is extended or adjusted under 35 U.S.C. 154(b) by 78 days.

(21) Appl. No.: 10/646,841

(22) Filed: Aug. 25, 2003

(65) Prior Publication Data

US 2004/0037536 A1 Feb. 26, 2004

(30) Foreign Application Priority Data

Aug. 26, 2002 (JP) ..................................... P2002-245907
Aug. 30, 2002 (JP) ..................................... P2002-256040

(51) Int. Cl.[7] ................................................ G02B 6/00
(52) U.S. Cl. ....................... 385/138; 385/128; 385/126; 385/39; 385/131; 156/294
(58) Field of Search ............................ 385/138, 39, 95, 385/139, 126–128, 131; 156/293–295

(56) References Cited

U.S. PATENT DOCUMENTS

| 5,305,413 | A | 4/1994 | Payne |
| 5,764,833 | A | 6/1998 | Kakii et al. |
| 5,970,194 | A | 10/1999 | Dunn et al. |
| 6,088,504 | A | 7/2000 | Filas et al. |
| 2001/0033729 | A1 | 10/2001 | Kuroha |
| 2002/0051617 | A1 | 5/2002 | Khan et al. |

FOREIGN PATENT DOCUMENTS

DE 36 28 391 2/1988

OTHER PUBLICATIONS

"Strain Relief for Optical Fibers at Entrance or Exit From a Duct," IBM Technical Disclosure Bulletin, IBM Corp., New York, US, vol. 32, No. 11, Apr. 1, 1990, pp. 389–390.
European Search Report, Dec. 1, 2004.

*Primary Examiner*—Fayez G. Assaf
(74) *Attorney, Agent, or Firm*—Blank Rome LLP

(57) ABSTRACT

An optical fiber assembly having a hermetic seal portion includes a optical fiber assembly and a metal pipe. The optical fiber assembly includes a metallized portion where a portion exposed by peeling off a resin coating of the optical fiber assembly is coated with metal. The metal pipe includes a feedthrough hole, an uncovered portion, a brazed portion and an adhesive-fixed portion. The feedthrough hole has a length necessary to cover a part of the metallized portion and a part of the coated portion leading to one end of the metallized portion. The uncovered portion has a housing groove leading to the feedthrough hole and contains a remainder of the metallized portion and a part of the coated portion leading to the other end of the metallized portion. The brazed portion hermetically seals the optical fiber assembly to the metal pipe by brazing the metallized portion and the inner surface of the feedthrough hole near a slanted upward opening of the feedthrough hole on the housing groove side. The adhesive-fixed portion allows the optical fiber assembly to be disposed on the uncovered portion adhere to the metal pipe and fixed thereto.

16 Claims, 12 Drawing Sheets

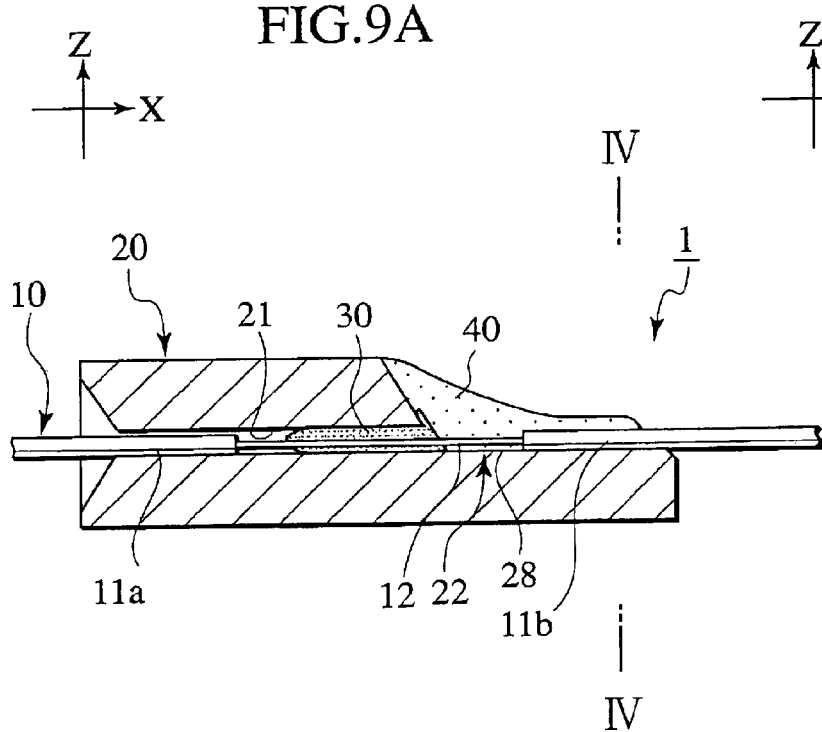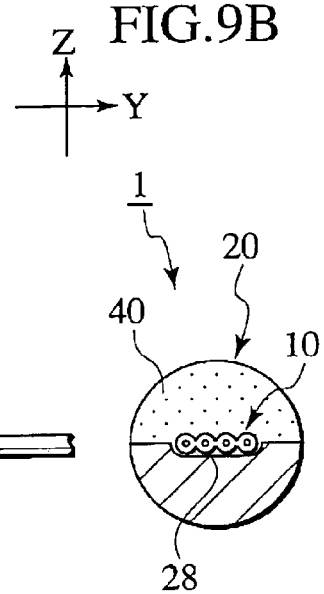

FIG.16A
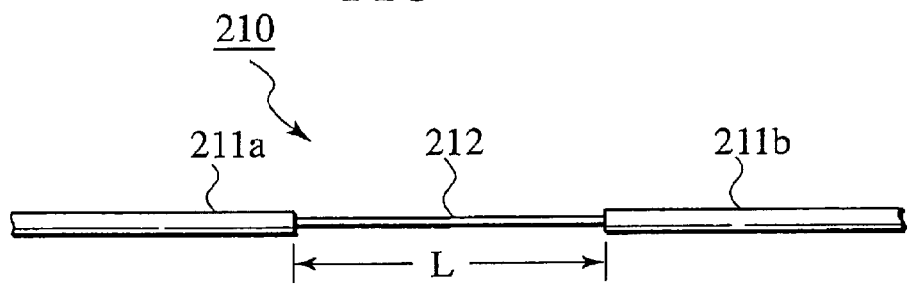
FIG.16B
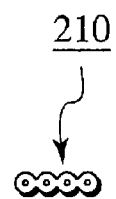
FIG.17A
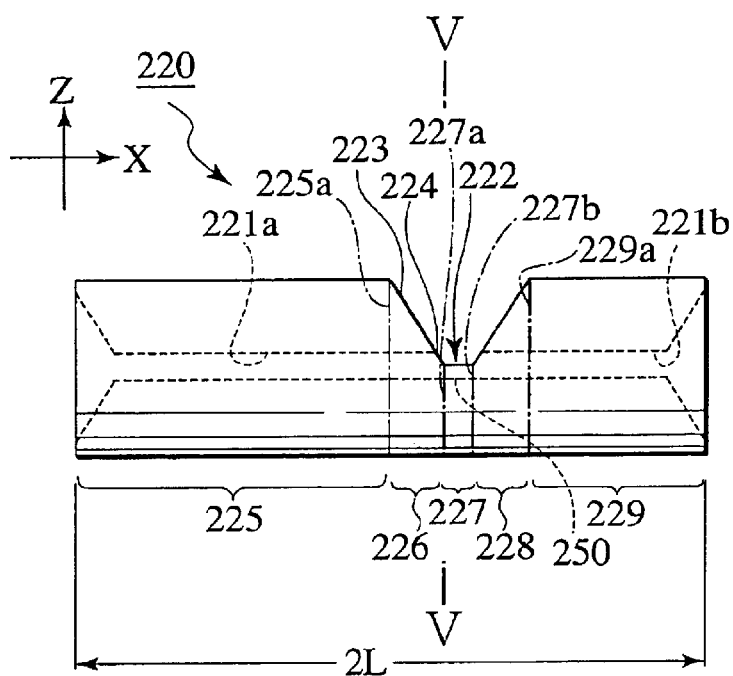
FIG.17B
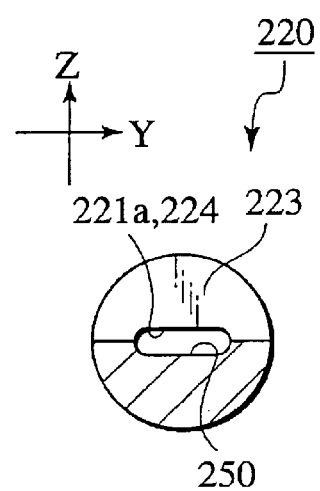
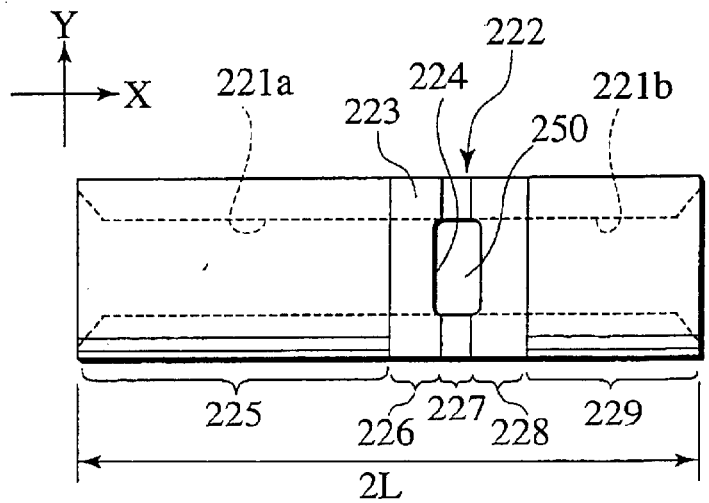
FIG.17C FIG.18A
FIG.18B
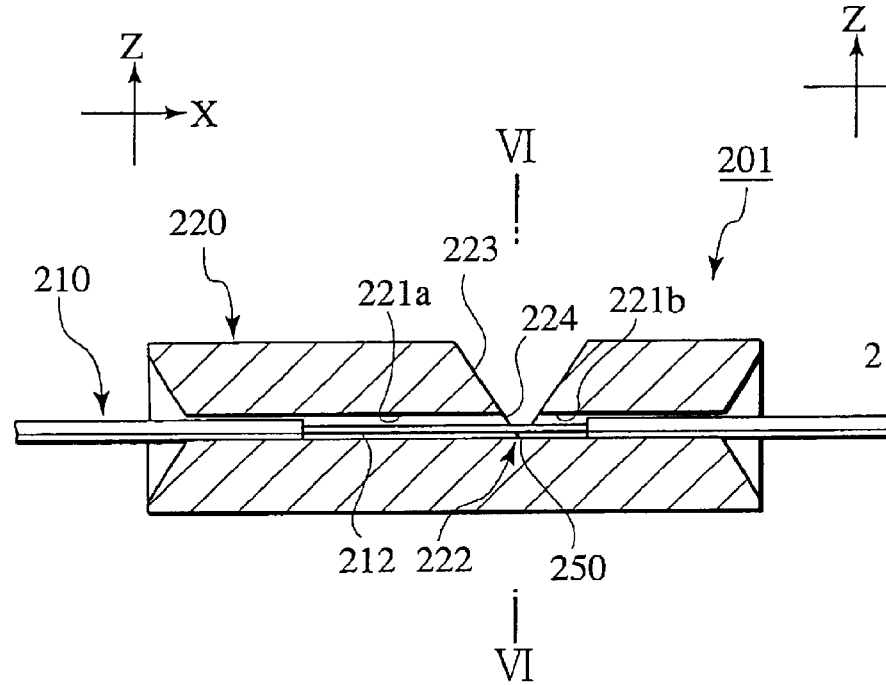
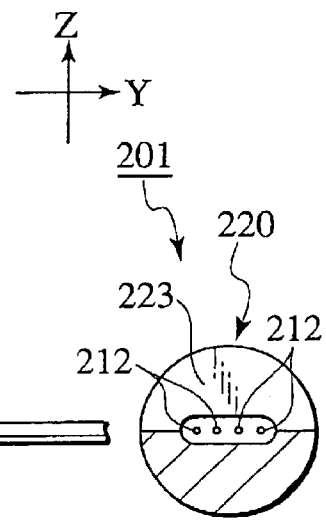
FIG.19A
FIG.19B
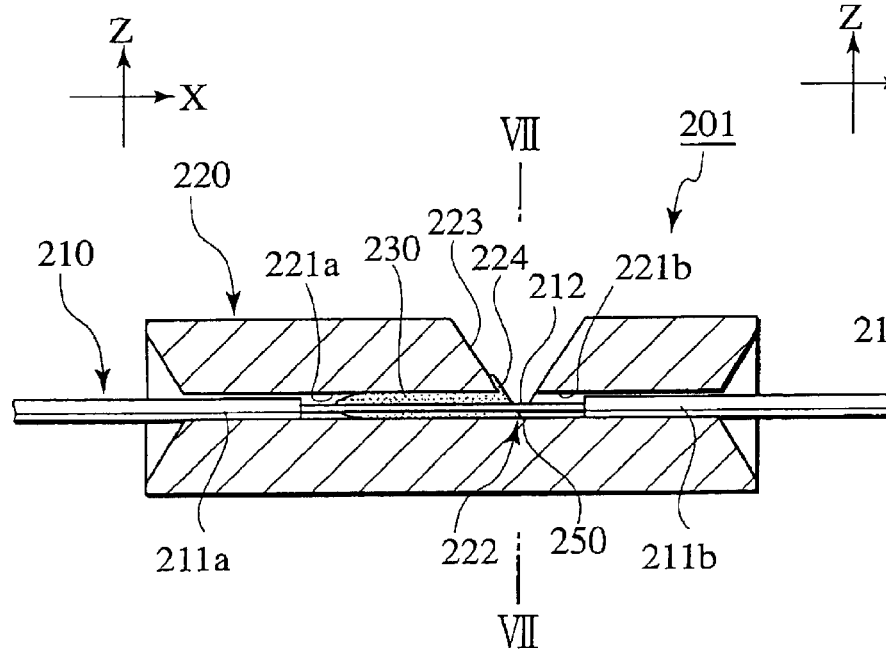
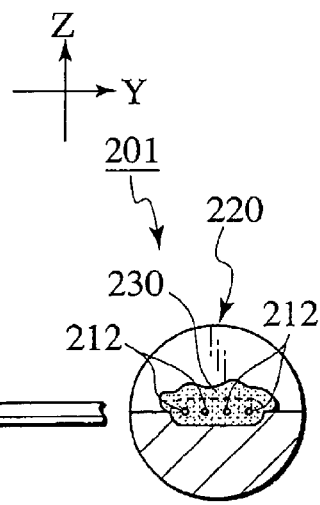

OPTICAL FIBER ASSEMBLY HAVING HERMETIC SEAL PORTION AND METHOD FOR MAKING THE SAME

CROSS REFERENCE TO RELATED APPLICATION

This application claims benefit of priority under 35 U.S.C. § 119 to Japanese Patent Application No. 2002-245907 filed on Aug. 26, 2002 and Japanese Patent Application No. 2002-256040 filed on Aug. 30, 2002, the entire contents of which are incorporated by reference herein.

BACKGROUND OF THE INVENTION

1. Field of the Invention

The present invention relates to an optical fiber assembly having a hermetic seal portion, which is used in a parallel optical transmission module and to a method for making the same.

2. Description of the Related Art

Typically, an optical module includes in its interior an optical element such as a waveguide channel, a light-emitting device, and is used for optically coupling in its interior the optical element to an optical fiber introduced from the outside. In a process of optically coupling the optical element included in the optical module to the optical fiber, a feedthrough portion for introducing the optical fiber into the optical module is formed through a wall of a package of the optical module. Since the package of the optical module must be hermetically sealed as a whole, hermetic sealing of the feedthrough portion is an important factor which influences the reliability of the optical module.

Further, a multi-core array of optical fibers is used for connecting the optical fibers to a planar waveguide channel and for coupling the optical fibers to an array of light-emitting devices, and is one of the elemental components essential for a parallel optical transmission module used in a high-density transmission system. In a process of optically coupling the multi-core array of optical fibers, i.e. an optical fiber assembly to the optical element of the parallel optical transmission module, the feedthrough portion for introducing the optical fiber assembly into the parallel optical transmission module is formed in the wall of the package of the parallel optical transmission module. Since the package of the parallel optical transmission module must be hermetically sealed as a whole, hermetic seal of the feedthrough is also an important factor which influences the reliability of the parallel optical transmission module.

In conventional hermetic sealing technology for an optical fiber assembly, there has been such a method that a part of the optical fiber assembly is metallized (coated with metal) after the coated film of that part having been peeled off, and then the metallized portion is directly soldered onto a package to seal hermetically. However, the method is of a little practical use, since the optical fiber assembly is liable to be cut off, for example, when external force is applied to the optical fiber assembly positioned at the boundary of a seal portion outside the package.

In order to solve the problem, the following method has been conventionally adopted. As shown in FIG. 1 and FIG. 2, after forming an optical fiber assembly with a hermetic seal portion 401 by soldering a metallized portion 412 of the optical fiber assembly 410 into a metal pipe 420 to seal the two hermetically, both the metal pipe 420 of the optical fiber assembly with the hermetic seal portion 401 and a package of a parallel optical transmission module not shown in the figures are hermetically sealed together. In this method, as the solder for sealing the optical fiber assembly 410 and the metal pipe 420 used is a high melting point solder which is not influenced by the temperature to be employed for sealing the package.

However, the following problem will occur even if this method may be employed. In order to construct the optical fiber assembly with the hermetic seal portion 401 as shown in FIG. 1 and FIG. 2, it is necessary to insert the metallized portion 412 of the optical fiber assembly 410 into a flat feedthrough hole 421 formed in the central part of a cylindrical metal pipe 420 and to enter solder from an edge of the metal pipe 420 into the feedthrough hole 421.

According to such structural restraint, it is practically necessary to inject solder into the feedthrough hole 421 while the metal pipe 420 is heated in such a state that the metallized portion 412 of the optical fiber assembly 410 is exposed out of the edge of the metal pipe 420, and then to draw back the optical fiber assembly 410 or the metal pipe 420 in order to receive the metallized portion 412 in the interior of the feedthrough hole 421 while the metal pipe 420 is kept heated so as not to allow the injected solder to solidify. In this method, the solder injected into the feedthrough hole 421 is liable to get localized since the optical fiber assembly 410 requires stirring in the metal pipe 420 during the soldering process. Consequently, there has been often such a case where a stable hermetic seal cannot be obtained.

In order to solve the problem, the following two methods may be taken into consideration. The first method is that the metallized portion 412 is positioned near the edge of the metal pipe 420 and is soldered at the location in order to solder the optical fiber assembly 410 without stirring it. However, since the optical fiber assembly 410 positioned outside the metal pipe 420 apart from the soldered site is not protected with the metal pipe 420 in this method, its bending strength is remarkably weak.

The second method is such that a paste-like solder is placed by injection into the feedthrough hole 421 of the metal pipe 420; the optical fiber assembly 410 is positioned in the prescribed place; and the metal pipe 420 is then heated. However, since flux components may normally be mixed in the paste-like solder in this method, the mixed flux must be removed using a flux removal agent after the soldering process. Therefore, the coating of the optical fiber assembly 410 is liable to be damaged by the flux removal agent.

SUMMARY OF THE IVENTION

The object of the present invention is proposed in view of the above circumstances, and aims to provide an optical fiber assembly having a hermetic seal portion and a method for manufacturing the same through which a metal-coated portion of the optical fiber assembly can be hermetically sealed to a feedthrough hole of a metal pipe (a hermetic connection component) without stirring the optical fiber assembly in the feedthrough hole using not any particular solders such as a paste-like solder, a powder-like solder but an ordinary fluxless solder, and also to provide a bundle of ribbon fibers having a hermetic seal portion and a method for manufacturing the same through which metal-coated portions of the bundle of ribbon fibers can be hermetically sealed to a feedthrough hole of a metal pipe (a hermetic connection component) without stirring the bundle of ribbon fibers in the feedthrough hole and not using any particular solders such as a paste-like solder, a powder-like solder but an ordinary fluxless solder. Another object of the present invention aims to provide an optical fiber assembly (or a bundle of ribbon fibers) having a hermetic seal portion through which an operator can easily and efficiently inject solder into the feedthrough hole at the time of manufacturing the same.

In order to achieve the above object, the present invention provides an optical fiber assembly having a hermetic seal portion for the use of a parallel optical transmission module comprising an optical fiber assembly including a metal-coated portion where a portion exposed by peeling off resin coating by a prescribed length at a distance from end portions thereof is coated with metal, a hermetic connection component having a feedthrough hole which extends from one end of the component for covering at least a part of the metal-coated portion of the optical fiber assembly, a housing groove to be open in an uncovered state which leads to the feedthrough hole and extends to the other end of the component for containing the remainder of the metal coated portion of the optical fiber assembly, and an upward opening formed so as to slant in a direction coming close to the one end of the component at the boundary between the feedthrough hole and the housing groove, wherein the component is made of metal and has a length equal to the sum of the length of the metal-coated portion of the optical fiber assembly plus the required length of the resin-coated portions leading to both sides of the metal-coated portion, a brazed portion where at least the metal-coated portion near the upward opening within the feedthrough hole is hermetically sealed to the hermetic connection component by brazing through the upward opening of the hermetic connection component, and an adhesive-fixed portion where at least parts of the resin-coated portion as well as the metal-coated portion exposed on the housing groove are fixed with an adhesive to the hermetic connection component.

According to the present invention, since the optical fiber assembly having the hermetic seal portion includes the hermetic connection component in which the upward opening is formed so as to slant in a direction of coming close to the one end thereof, it is easy to inject solder into the feedthrough hole. Therefore, it can be soldered without being stirred just as the optical fiber assembly inserted into the feedthrough hole is disposed in the hermetic connection component. Further, it can be easy to hermetically seal the metal-coated portion of the optical fiber assembly and the hermetic connection component together by means of a fluxless solder in an inert gas atmosphere. Also, since an opening of the feedthrough hole on the housing groove side takes the form of slanting in a direction of coming close to the one end of the hermetic connection component, the contact area of solder increases at this opening. Therefore, an operator can easily and efficiently inject solder into the feedthrough hole at the time of manufacturing the same.

In order to achieve the above object, the present invention provides a method for manufacturing an optical fiber assembly having a hermetic seal portion by inserting the optical fiber assembly into a feedthrough hole of a hermetic connection component to seal hermetically, wherein the optical fiber assembly includes a metal-coated portion where a portion exposed by peeling off resin coating by a prescribed length at a distance from end portions thereof is coated with metal, the hermetic connection component has the feedthrough hole which extends from one end of the component for covering at least a part of the metal-coated portion of the optical fiber assembly, a housing groove to be open in an uncovered state which leads to the feedthrough hole and extends to the other end of the component for containing the remainder of the metal coated portion of the optical fiber assembly, and an upward opening formed so as to slant in a direction coming close to the one end of the component at the boundary between the feedthrough hole and the housing groove, further, the component is made of metal and has a length equal to the sum of the length of the metal-coated portion of the optical fiber assembly plus the required length of the resin-coated portions leading to both sides of the metal-coated portion, the method comprising the steps of positioning the metal-coated portion substantially in the center of the hermetic connection component through inserting the optical fiber assembly into the feedthrough hole of the hermetic connection component, replacing an atmosphere surrounding the hermetic connection component with an inert gas, sealing hermetically the metal-coated portion in the feedthrough hole at least near the upward opening to the hermetic connection component by heating the hermetic connection component and by injecting solder into the upward opening, and further fixing at least parts of the resin-coated portion as well as the metal-coated portion exposed on the housing groove with an adhesive to the hermetic connection component.

According to the present invention, since the method for manufacturing an optical fiber assembly having a hermetic seal portion is easily carried out at least by heating the hermetic connection component and by injecting solder into the upward opening formed so as to slant in a direction coming close to the one end of the hermetic connection component, the optical fiber assembly can be soldered without being stirred just as the optical fiber assembly inserted into the feedthrough hole is disposed in the hermetic connection component. Therefore, it can be easy to hermetically seal the metal-coated portion of the optical fiber assembly and the hermetic connection component together by means of a fluxless solder in the inert gas atmosphere. Also, since an opening of the feedthrough hole on the housing groove side takes the form of slanting in a direction of coming close to the one end of the hermetic connection component, the contact area of solder increases at this opening. Therefore, an operator can easily and efficiently inject solder into the feedthrough hole at the time of manufacturing the same.

In order to achieve the above object, the present invention provides an optical fiber assembly having a hermetic seal portion for the use of a parallel optical transmission module comprising an optical fiber assembly including a metal-coated portion where a portion exposed by peeling off resin coating by a prescribed length at a distance from end portions thereof is coated with metal, a hermetic connection component having a feedthrough hole divided into a first feedthrough hole which extends from one end of the component for covering at least a part of the metal-coated portion of the optical fiber assembly and a second feedthrough hole which extends from the other end of the component, an housing groove to be open in an uncovered state which leads to the first feedthrough hole and the second feedthrough hole, and an upward opening formed so as to slant in a direction coming close to the one end of the component at the boundary between the first feedthrough hole and the housing groove, wherein the component is made of metal and has a length equal to the sum of the length of the metal-coated portion of the optical fiber assembly plus the required length of the resin-coated portions leading to both sides of the metal-coated portion, and a brazed portion where the metal-coated portion at least near the upward opening within the first feedthrough hole is hermetically sealed to the hermetic connection component by brazing through the upward opening of the hermetic connection component.

According to the present invention, since the optical fiber assembly having the hermetic seal portion includes the hermetic connection component in which the upward opening is formed so as to slant in a direction coming close to the one end thereof, it is easy to inject solder into the feedthrough hole. Therefore, it can be soldered without being stirred just as the optical fiber assembly inserted into the first feedthrough hole and the second feedthrough hole are disposed in the hermetic connection component. Further, it can be easy to hermetically seal the metal-coated portion of the optical fiber assembly and the hermetic connection component together by means of a fluxless solder. Also, since the hermetic connection component includes the second feedthrough hole, it is not necessary to fix the optical fiber assembly exposed on the housing groove with an adhesive to the hermetic connection component. Moreover, since an opening of the feedthrough hole on the housing groove side takes the form of slanting in a direction coming close to the one end of the hermetic connection component, the contact area of solder increases at this opening. Therefore, an operator can easily and efficiently inject solder into the feedthrough hole at the time of manufacturing the same.

In order to achieve the above object, the present invention provides a method for manufacturing an optical fiber assembly having a hermetic seal portion by inserting the optical fiber assembly into a feedthrough hole of a hermetic connection component to seal hermetically, wherein the optical fiber assembly includes a metal-coated portion where a portion exposed by peeling off resin coating by a prescribed length at a distance from an end portion thereof is coated with metal, the hermetic connection component has the feedthrough hole divided into a first feedthrough hole which extends from one end of the component for covering at least a part of the metal-coated portion of the optical fiber assembly and a second feedthrough hole which extends from the other end of the component, an housing groove to be open in an uncovered state which leads to the first feedthrough hole and the second feedthrough hole, and an upward opening formed so as to slant in a direction coming close to the one end of the component at the boundary between the first feedthrough hole and the housing groove, wherein the component is made of metal and has a length equal to the sum of the length of the metal-coated portion of the optical fiber assembly plus the required length of the resin-coated portions leading to both sides of the metal-coated portion, the method comprising the steps of positioning the metal-coated portion substantially in the center of the hermetic connection component through inserting the optical fiber assembly into the first and second feedthrough holes of the hermetic connection component, replacing an atmosphere surrounding the hermetic connection component with an inert gas, and sealing hermetically the metal-coated portion in the first feedthrough hole at least near the upward opening to the hermetic connection component by heating the hermetic connection component and by injecting solder into the upward opening.

According to the present invention, since the method for manufacturing an optical fiber assembly having a hermetic seal portion is easily carried out at least by heating the hermetic connection component and by injecting solder into the upward opening formed so as to slant in a direction coming close to the one end of the hermetic connection component, the optical fiber assembly can be soldered without being stirred just as the optical fiber assembly inserted into the first feedthrough hole and the second feedthrough hole is disposed in the hermetic connection component. Therefore, it can be easy to hermetically seal the metal-coated portion of the optical fiber assembly and the hermetic connection component together by means of a fluxless solder. Also, since the hermetic connection component includes the second feedthrough hole, it is not necessary to fix the optical fiber assembly exposed on the housing groove with an adhesive to the hermetic connection component. Also, since an opening of the feedthrough hole on the housing groove side takes the form of slanting in a direction coming close to the one end of the hermetic connection component, the contact area of solder increases at this opening. Therefore, an operator can easily and efficiently inject solder into the feedthrough hole at the time of manufacturing the same.

BRIEF DESCRIPTION OF THE DRAWINGS

FIG. 9A and FIG. 9B are a front view in a vertical cross-section and a cross-sectional view along a IV—IV line, respectively, showing a state where a coated portion of the optical fiber assembly is fixed to the metal pipe with an adhesive relating to the first embodiment of the present invention.

FIG. 16A and FIG. 16B are a front view and a side view of the optical fiber assembly, respectively, relating to the third embodiment of the present invention.

FIG. 17A, FIG. 17B and FIG. 17C are a front view, a cross-sectional view along a V—V line and a plane view of a metal pipe, respectively, relating to the third embodiment of the present invention;

FIG. 18A and FIG. 18B are a front view in a vertical cross-section and a cross-sectional view along a VI—VI line, respectively, showing a state where the optical fiber assembly is inserted into the metal pipe relating to the third embodiment of the present invention;

FIG. 19A and FIG. 19B are a front view in a vertical cross-section and a cross-sectional view along a VII—VII line, respectively, showing a state where a metallized portion of the optical fiber assembly and the metal pipe are hermetically sealed relating to the third embodiment of the present invention;

DETAILED DESCRIPTION OF THE INVENTION

Figure 1:
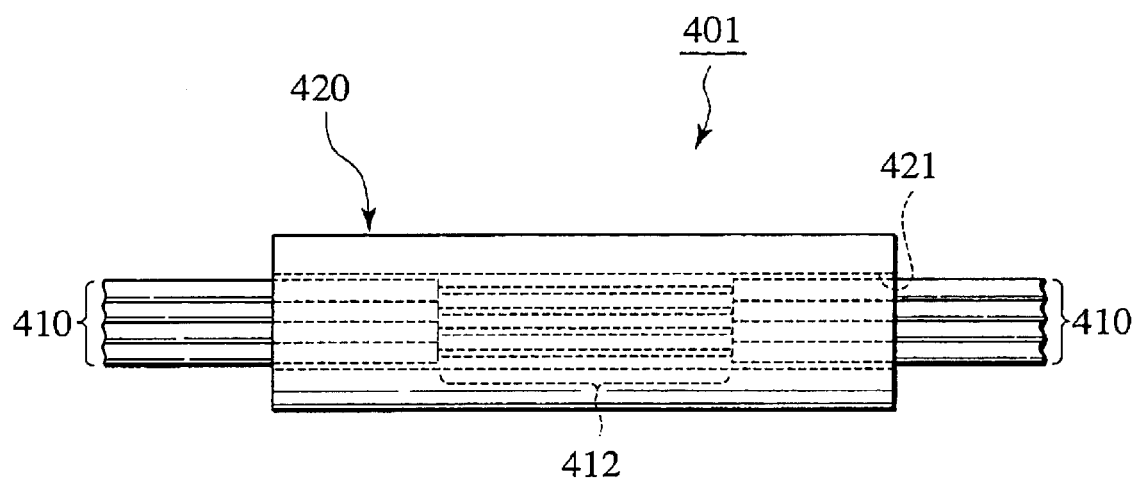
FIG. 1 is a plane view of a conventional optical fiber assembly with a hermetic seal portion.
Figure 2:
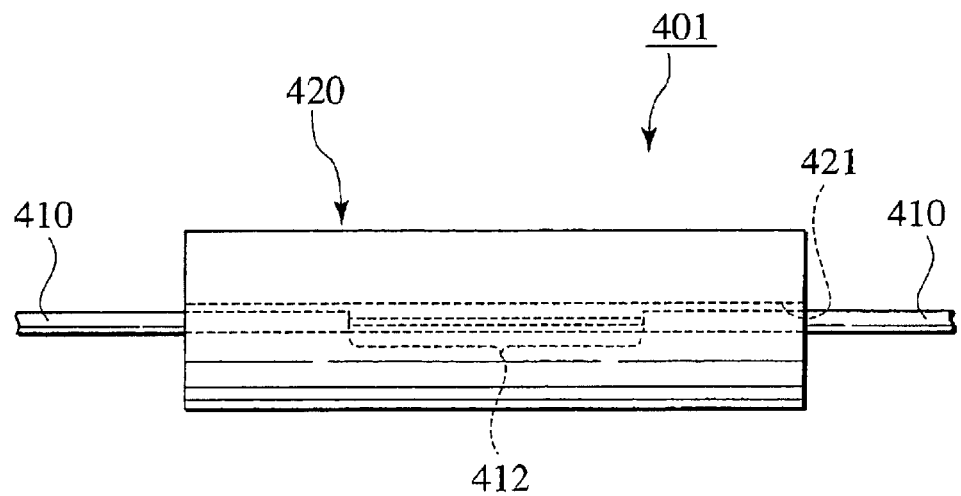
FIG. 2 is a front view of the conventional optical fiber assembly with the hermetic seal portion.

The first embodiment to fourth embodiment of the present invention will now be described referring to the drawings.
(First Embodiment)

Figure 3:
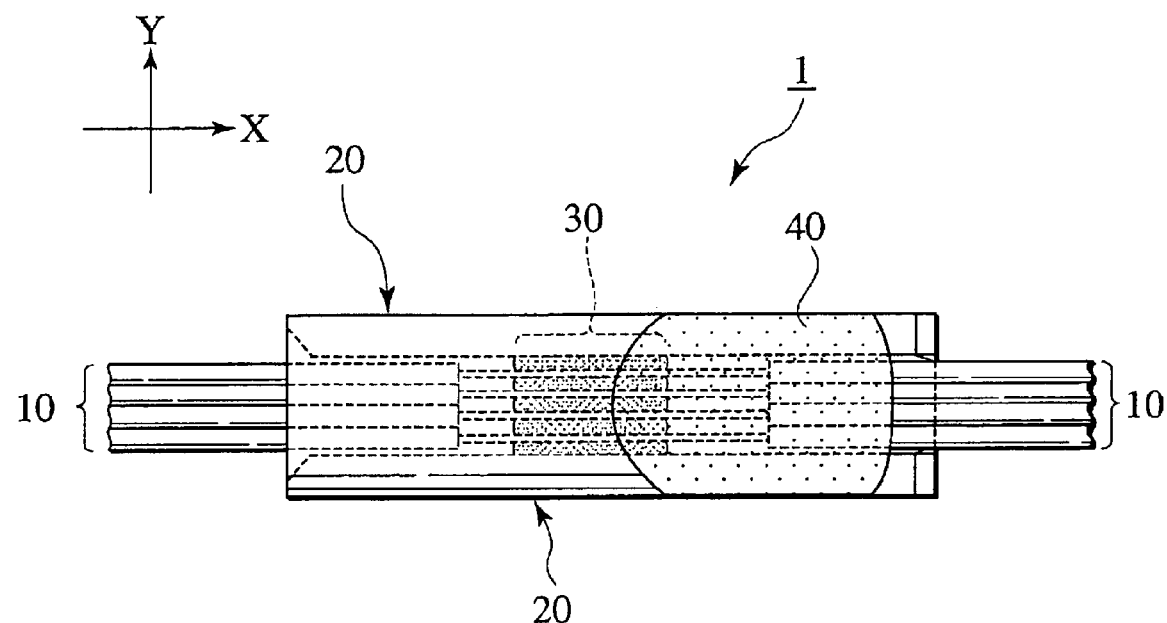
FIG. 3 is a plane view of an optical fiber assembly having a hermetic seal portion relating to the first embodiment of the present invention.
Figure 4:
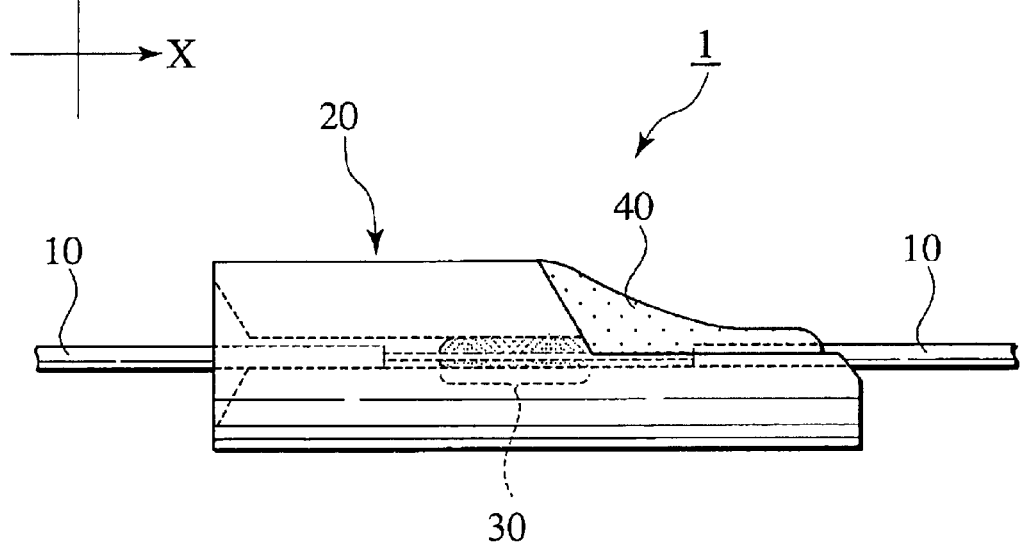
FIG. 4 is a front view of the optical fiber assembly having the hermetic seal portion relating to the first embodiment of the present invention.

As shown in FIG. 3 and FIG. 4, an optical fiber assembly having a hermetic seal portion 1 comprises an optical fiber assembly 10, a metal pipe (a hermetic connection component) 20, a brazed portion 30 and an adhesive-fixed portion 40. Further, X-axis is set in the longitudinal direction of the metal pipe 20, Y-axis in the width direction thereof and Z-axis in the vertical direction thereof, respectively. X-axis, Y-axis and Z-axis are perpendicular to one another.

Figure 5A:
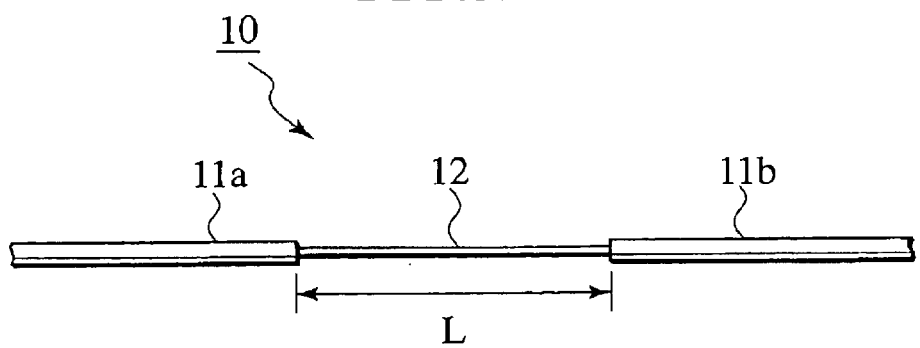
FIG. 5A and FIG. 5B are a front view and a side view of the optical fiber assembly, respectively, relating to the first embodiment of the present invention.
Figure 5B:

The optical fiber assembly 10 is, for example, a four-core optical fiber ribbon in which four optical fiber cores are disposed in parallel side by side, comprising coated portions (resin-coated portions) 11a, 11b and a metallized portion (a metal-coated portion) 12 as shown in FIG. 5A and FIG. 5B. As shown in FIG. 5A, the metallized portion 12 is formed through coating with a metal (Ni/Au) a portion which has been exposed by peeling off resin coating of the optical fiber assembly 10 by a prescribed length L at a distance from end portions of the optical fiber assembly 10.

Figure 6A:
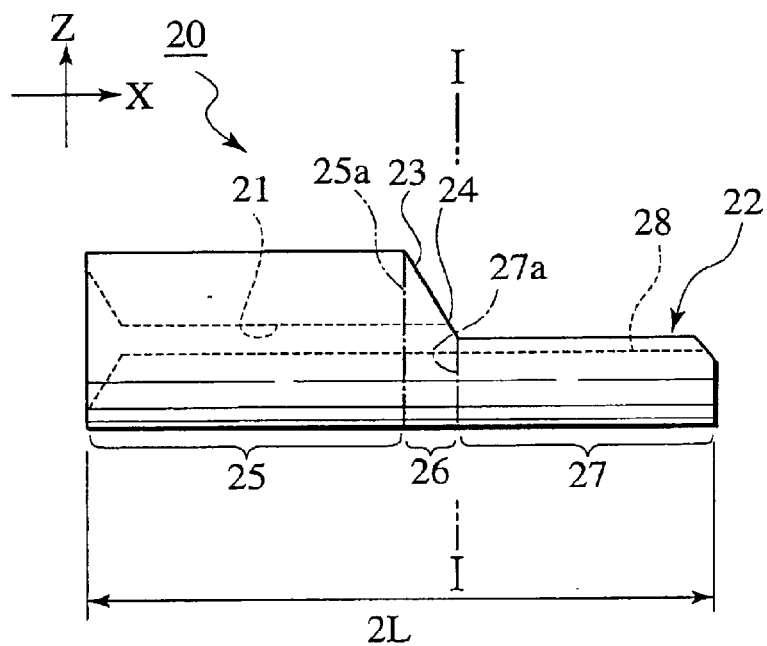
FIG. 6A, FIG. 6B and FIG. 6C are a front view, a cross-sectional view along a I—I line and a plane view of a metal pipe, respectively, relating to the first embodiment of the present invention.

The metal pipe 20 has, as shown in FIG. 6A, the length equal to about twice the length L of the metallized portion 12 of the optical fiber assembly 10 in the longitudinal direction along the X-axis. A feedthrough hole 21 extending from one end (on the −X side) of the metal pipe 20 has the length necessary to contain at least the major part of the metallized portion 12 when the metallized portion 12 of the optical fiber assembly 10 is disposed longitudinally in the central part of the metal pipe 20. Further, a portion of the feedthrough hole 21 from an upward opening 24 to the other end (on the +X side) of the metal pipe 20 is in an uncovered state, and an oblique face 23 is formed so as to slant in a direction of coming close to the one end (on the −X side) of the metal pipe 20 at the boundary between the feedthrough hole 21 and the uncovered portion 22. At the lower part of the oblique face 23 formed is the upward opening 24 of the feedthrough hole 21.

Figure 6B:
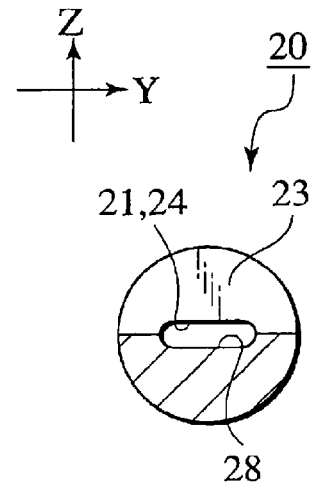
Figure 6C:
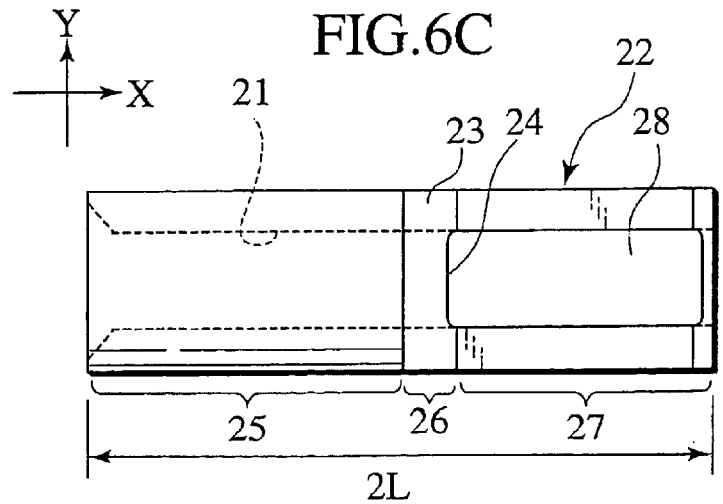

The shape of the metal pipe 20 will be described in details in the following. The metal pipe 20 is, as shown in FIG. 6A, divided into three portions: a cylinder portion 25, a connection portion 26 and a semi-cylinder portion 27. The cylinder portion 25 has a circular Y-Z cross section and is in the shape of a cylinder extending along X-axis, and includes the flat feedthrough hole 21, into which the optical fiber assembly 10 can be inserted, disposed along the X-axis in the central part of the cylinder portion 25. The semi-cylinder portion 27 has a semi-circular Y-Z cross section and is in the shape of a semi-cylinder extending along the X-axis, and as shown in FIG. 6C, the uncovered portion 22 with a housing groove 28 leading to the feedthrough hole 21 and being able to contain the optical fiber assembly 10 is formed in the central part on the upper surface, viewed from the X-Y plane, of the semi-cylinder portion 27. Further, the corner of the top end portion on the +X side of the semi-cylinder portion 27 is chamfered in order not to damage the optical fiber assembly 10 when an external force acting in the −Z direction is applied to the optical fiber assembly 10 at this position. Additionally, the semi-circle of the semi-cylinder portion 27 in the Y-Z cross section is equiform to a lower half of the circle of the cylinder portion 25 in the Y-Z cross section. Further, the semi-oblong of the housing groove 28 in the Y-Z cross section is equiform to a lower half of the oblong of the feedthrough hole 21 in the Y-Z cross section. The connection portion 26 is located between the cylinder portion 25 and the semi-cylinder portion 27, and connects the edge 25a on the +X side of the cylinder portion 25 smoothly to the edge 27a on the −X side of the semi-cylinder portion 27. In the central part of the connection portion 26, the feedthrough hole 21 disposed in the central part of the cylinder portion 25 extends along the X-axis. Further, as shown in FIG. 6B, the side of the connection portion 26, which is not hidden by the semi-cylinder portion 27 in the view from the end portion on the +X side of the metal pipe 20, is named the oblique face 23. In the central lower part of the oblique face 23 formed is the upward opening 24 of the feedthrough hole 21. Further, the corner of the end portion on the −X side near the opening of the feedthrough hole 21 is chamfered in order not to damage the optical fiber assembly 10 when external force acting in the direction of the Y-axis and/or the Z-axis is applied to the optical fiber assembly 10 at this position.

Figure 8A:
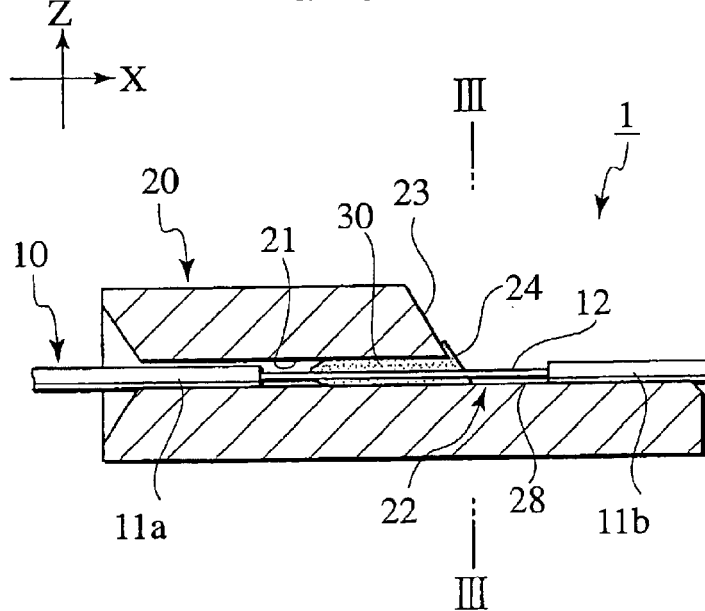
FIG. 8A and FIG. 8B are a front view in a vertical cross-section and a cross-sectional view along a III—III line, respectively, showing a state where a metallized portion of the optical fiber assembly and the metal pipe are hermetically sealed relating to the first embodiment of the present invention.

The brazed portion 30 is a portion where the metallized portion 12 in the feedthrough hole 21 is hermetically sealed, at least in the vicinity of the upward opening 24, to the metal pipe 20, as shown in FIG. 8A, by inserting solder through the upward opening 24 of, the feedthrough hole 21 to solder the metallized portion 12 within the feedthrough hole 21.

The adhesive-fixed portion 40 is a portion where the metallized portion 12 exposed on the uncovered portion 22 and at least a part of the coated portion 11b are fixed with an adhesive to the metal pipe 20, as shown in FIG. 9A.

Next, a method for manufacturing the optical fiber assembly having the hermetic seal portion 1 will be described. First prepared are the optical fiber assembly 10 on which the metallized portion 12 having the prescribed length L is formed at a distance from the end portions of the optical fiber assembly 10 as shown in FIG. 5A and FIG. 5B, and the metal pipe 20 in which the upward opening 24 is formed on a lower part of the oblique face 23 at the boundary between the feedthrough hole 21 and the housing groove 28 as shown in FIG. 6A, FIG. 6B and FIG. 6C.

Figure 7A:
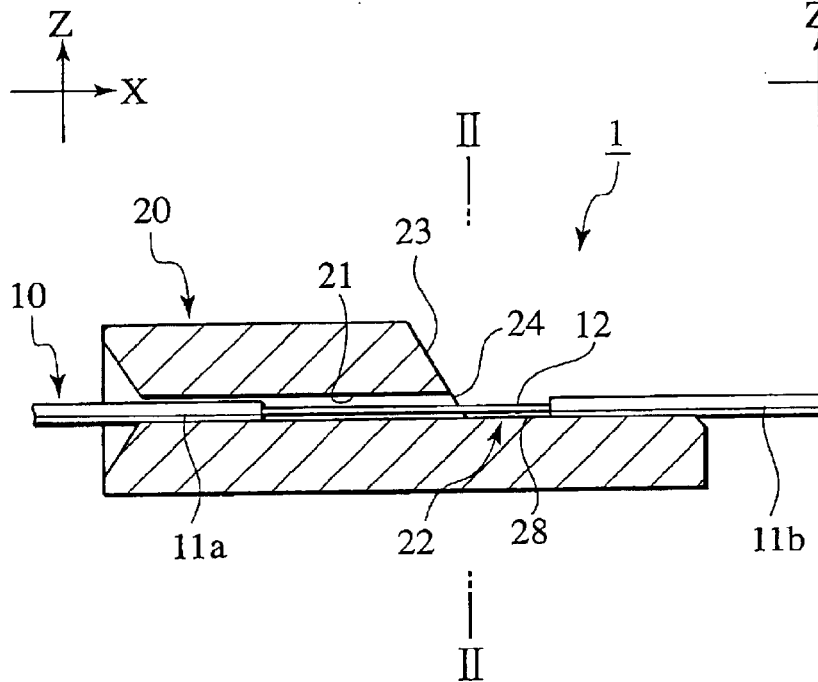
FIG. 7A and FIG. 7B are a front view in a vertical cross-section and a cross-sectional view along a II—II line, respectively, showing a state where the optical fiber assembly is inserted into the metal pipe relating to the first embodiment of the present invention.
Figure 7B:
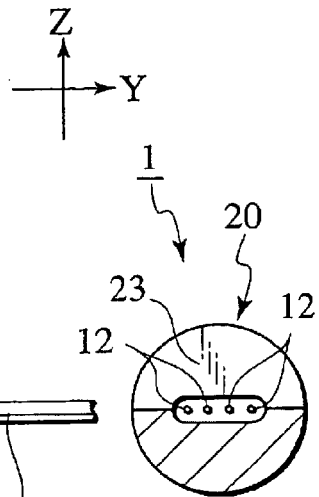

Then, as shown in FIG. 7A, the optical fiber assembly 10 is inserted into the feedthrough hole 21 of the metal pipe 20 in order to set the metallized portion 12 in the longitudinally central portion of the metal pipe 20, and also a part of the remainder of the optical fiber assembly 10 is disposed in the housing groove 28 of the uncovered portion 22 of the metal pipe 20.

Next, the atmosphere surrounding the metal pipe 20 is replaced with an inert gas (for example, nitrogen).

Figure 8B:
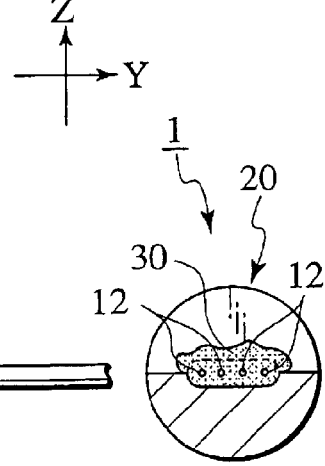

In the inert gas atmosphere, the metallized portion 12 disposed at least near the upward opening 24 in the feedthrough hole 21 is hermetically sealed to the metal pipe 20 as shown in FIG. 8A and FIG. 8B by injecting solder wire through the upward opening 24 into the feedthrough hole 21 while the external surface of the metal pipe 20 covering the feedthrough hole 21 near the upward opening 24, preferably half or more of the external surface, is heated from both the opposite sides. Thus, the metallized portion 12 of the optical fiber assembly 10 and the metal pipe 20 are hermetically sealed together, and further since the coated portion 11a which leads to the metallized portion 12 at the end portion on the −X side of the metal pipe 20 is contained within the feedthrough hole 21 by a sufficient length thereof, sufficient strength against bending can be possessed.

After solder has been injected, heating is stopped, and the metal pipe 20 is taken out from the inert atmosphere (nitrogen).

Then, as shown in FIG. 9A and FIG. 9B, the metallized portion 12 and at least a part, preferably almost all of the coated portion 11b exposed on the uncovered portion 22 are fixed to the metal pipe 20 with an appropriate adhesive (for example, an epoxy adhesive). Thus, since the coated portion 11b, which leads to the end on the +X side of the metallized portion 12, is fixed to the uncovered portion 22 of the metal pipe 20 by a sufficient length thereof, sufficient strength against bending can be possessed.

Figure 10:
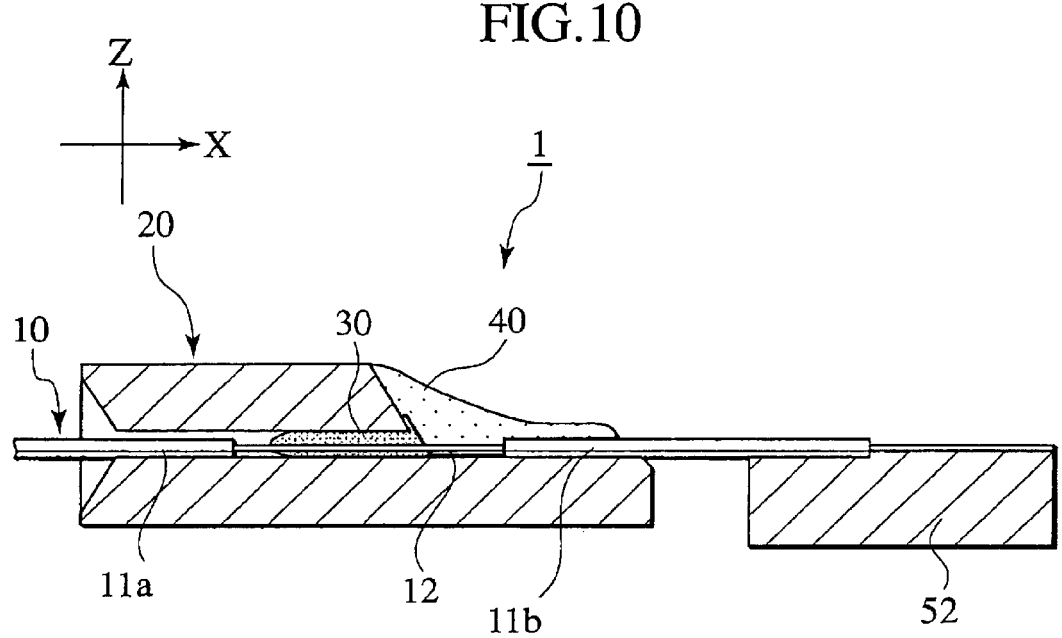
FIG. 10 is a front view in a vertical cross-section showing a state where a tip of the optical fiber assembly having a hermetic seal portion is fixed with an adhesive to a V-grooved array relating to the first embodiment of the present invention.

The top end of the optical fiber assembly having the hermetic seal portion 1 manufactured in such a manner is then exposed by peeling off the coated portion 11b of the optical fiber assembly 10, by the required length, extending in the +X direction from the end on the +X side of the metal pipe 20 as shown in FIG. 10, and the exposed part is made to adhere to a V-grooved array 52. The top end of the optical fiber assembly 10 is polished together with the V-grooved array 52.

Figure 11:
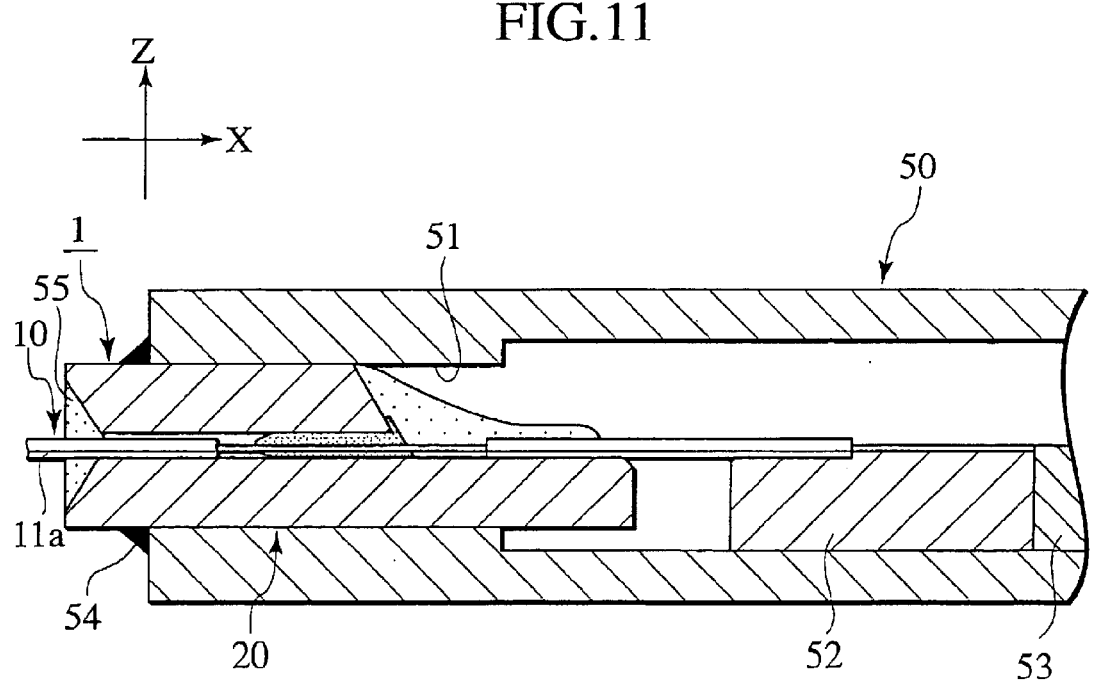
FIG. 11 is a front view in a vertical cross-section showing a state where a tip of the optical fiber assembly having a hermetic seal portion according to FIG. 10 is coupled with and fixed to a waveguide channel using an adhesive and then the metal pipe and a package are hermetically sealed and fixed using metal.

Next, as shown in FIG. 11, the metal pipe 20 is disposed in a feedthrough portion 51 of a package 50 of a parallel optical transmission module, and the top end of the optical fiber assembly 10 is bonded with an adhesive to a waveguide channel 53 disposed in the package 50. Then, the hermetic seal portion 54 is formed by hermetically sealing the metal pipe 20 and the package 50 outside the package 50 using metal, and the metal pipe 20 is fixed to the package 50. Further, if necessary, an adhesive-fixed portion 55 can be formed by fixing the opened end portion on the −X side of the metal pipe 20 and the coated portion 11a of the optical fiber assembly 10 together with an adhesive.

Since the optical fiber assembly having a hermetic seal portion 1 is composed as described above, it can be soldered without being stirred just as the metallized portion 12 of the optical fiber assembly 10 inserted into the feedthrough hole 21 is disposed substantially in the longitudinally central part of the metal pipe 20, and therefore, stable soldering can be achieved.

Further, the metallized portion 12 of the optical fiber assembly 10 and the metal pipe 20 can be hermetically sealed together with solder wire without using any particular solders such as a paste-like solder, a powder-like solder.

Further, a hermetic seal can be obtained using fluxless solder by injecting solder wire through the upward opening 24 into the feedthrough hole 21 while the external surface of the metal pipe 20 covering the feedthrough hole 21 near the upward opening 24 is heated in the inert gas (nitrogen) atmosphere without using any flux. Consequently, the manufacturing method is suitable as a method for hermetically sealing the optical fiber assembly 10 for which high reliability is required, because the method needs no flux removal after soldering and there are no unstable factors such as corrosion. Further, 80% Au/Sn solder with the melting point of 280° C. can be used as a fluxless solder with a high melting point.

Through a helium leak test using the optical fiber assembly having the hermetic seal portion 1 manufactured according to the above-mentioned manufacturing method, it was determined that the value of the helium leakage was less than $1 \times 10^{-10}$ Pa·m$^3$/sec.

Besides, in the first embodiment, a four-core optical fiber ribbon in which four optical fiber cores were disposed in parallel side by side was used as an example of the optical fiber assembly 10, however it is not exclusively limited thereto but an eight-core optical fiber ribbon in which eight optical fiber cores are disposed in parallel side by side or a twelve-core optical fiber ribbon in which twelve optical fiber cores are disposed in parallel side by side can also be employed.

Further, in the first embodiment, the length of the feedthrough hole 21 was formed as the length necessary to contain at least the major part of the metallized portion 12, that is to say, the length which contained more than half of the metallized portion 12 as shown in FIG. 7A, when the metallized portion 12 was located substantially in the central part of the metal pipe 20. However, the length of the feedthrough hole 21 is not exclusively limited thereto, but the length can be formed in as any length, for example, from the length which may contain only part of the metallized portion 12 to the length which may contain almost all of the metallized portion 12.

Still, further, in the first embodiment as shown in FIG. 10 and FIG. 11, the top end of the optical fiber assembly 10 was exposed by peeling off the coating of the optical fiber assembly 10, by a required length, extending in the +X direction from the metal pipe 20, and the exposed part was made to adhere to the V-grooved array 52, and then the metal pipe 20 and the package 50 were hermetically sealed and fixed together with metal after the top end was bonded with the adhesive to the waveguide channel 53. However, the process is not exclusively limited thereto, for instance, it is possible that the top end of the optical fiber assembly 10 is exposed by peeling off coating of the optical fiber assembly 10, by the required length, extending not in the +X direction but in the −X direction from the metal pipe 20, and the exposed part is made to adhere to the V-grooved array 52, and then the metal pipe 20 and the package 50 are hermetically sealed and fixed together with metal after the top end is bonded with an adhesive to the waveguide channel 53.

(Second Embodiment)

Figure 12:
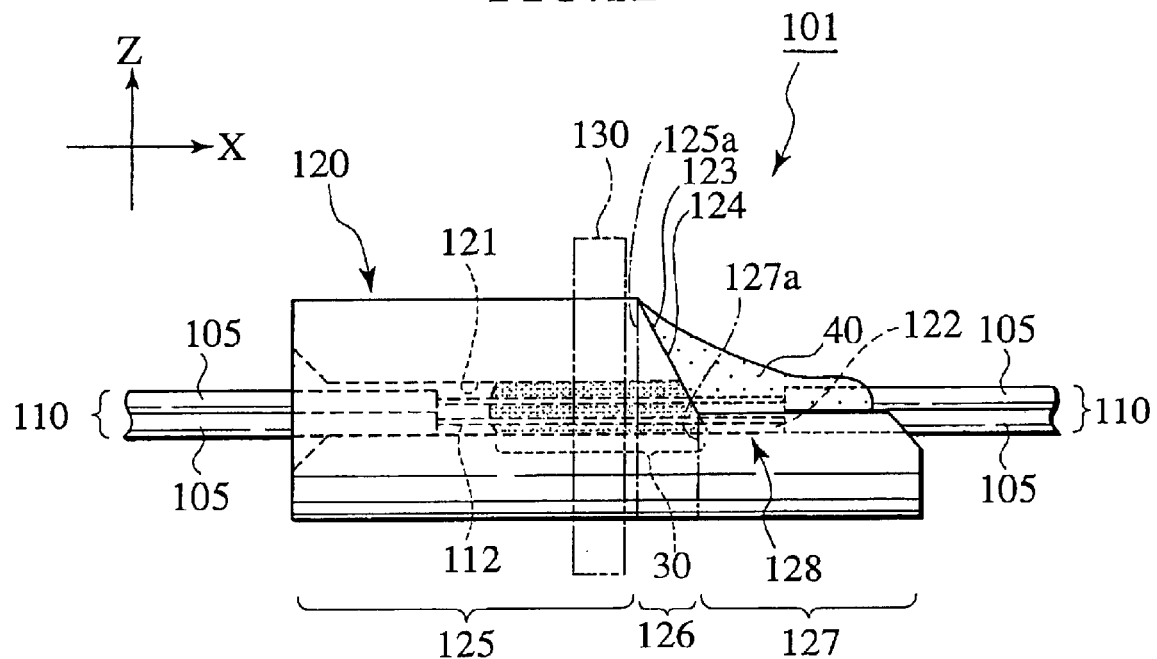
FIG. 12 is a front view of a bundle of ribbon fibers having a hermetic seal portion relating to the second embodiment of the present invention.
Figure 13:
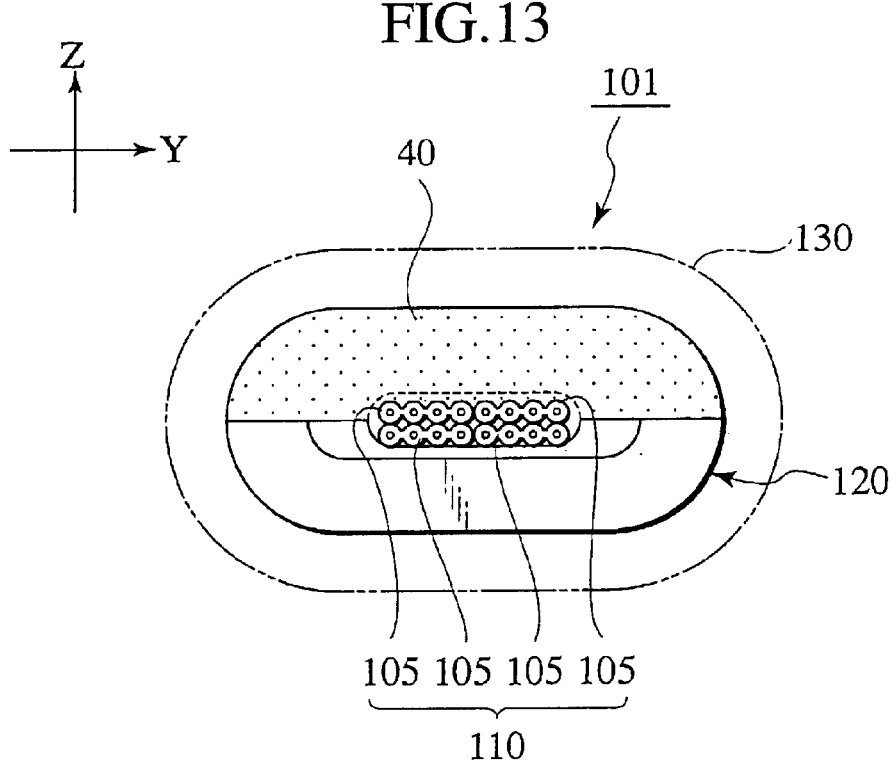
FIG. 13 is a side view of the bundle of the ribbon fibers having the hermetic seal portion relating to the second embodiment of the present invention.

As shown in FIG. 12 and FIG. 13, a bundle of ribbon fibers having a hermetic seal portion 101 comprises a bundle of ribbon fibers 110, a metal pipe (a hermetic connection component) 120, a brazed portion 30 and an adhesive-fixed portion 40. Further, the X-axis is set in the longitudinal direction of the metal pipe 120, the Y-axis in the width direction thereof and the Z-axis in the vertical direction thereof, respectively. The X-axis, Y-axis and Z-axis are perpendicular to one another.

The bundle of ribbon fibers having a hermetic seal portion 101 deals with a bundle of a plurality (four ribbons) of ribbon fibers 105 (for example, the ribbon fiber 105 is a four-core optical fiber ribbon in which four optical fiber cores are disposed in parallel side by side) piled one on the other in multi-layers (for example, two layers) and placed side by side in rows (for example, two rows). Further the bundle of ribbon fibers 110 comprises a metallized portion (a metal-coated region) 112 and coated portions (resin-coated regions).

The shape of the metal pipe 120 will be described in detail in the following. The metal pipe 120 is, as shown in FIG. 12, divided into three portions: an ellipse column portion 125, a connection portion 126 and a semi-ellipse column portion 127. The ellipse column portion 125 has a flat elliptic Y-Z cross section and is in the shape of a nearly elliptic column extending along X-axis, and includes the flat feedthrough hole 121, into which the bundle of ribbon fibers 110 can be inserted, disposed along the X-axis in the central part of the ellipse column portion 125. The semi-ellipse column portion 127 has a flat semi-elliptic Y-Z cross section and is in the shape of a nearly semi-elliptic column extending along the X-axis, and the uncovered portion 122 with a housing groove 128, leading to the feedthrough hole 121, in which the bundle of ribbon fibers 110 can be contained is formed in the central part on the upper surface, parallel to the X-Y plane, of the semi-ellipse column portion 127. Further, the corner of the top end portion on the +X side of the semi-ellipse column portion 127 is chamfered in order not to damage the bundle of ribbon fibers 110 when external force generated in the –Z direction is applied to the bundle of ribbon fibers 110 at this position. Additionally, the nearly semi-elliptic shape of the semi-ellipse column portion 127 in the Y-Z cross section is equiform to a lower half of the nearly elliptic shape of the ellipse column portion 125 in the Y-Z cross section. Further, the semi-oblong of the housing groove 128 in the Y-Z cross section is equiform to a lower half of the oblong of the feedthrough hole 121 in the Y-Z cross section. The connection portion 126 is located between the ellipse column portion 125 and the semi-ellipse column portion 127, and connects the edge 125a on the +X side of the ellipse column portion 125 smoothly to the edge 127a on the –X side of the semi-ellipse column portion 127. In the central part of the connection portion 126, the feedthrough hole 121 disposed in the central part of the ellipse column portion 125 extends along the X-axis. Further, the side of the connection portion 126, which is not hidden by the semi-ellipse column portion 127 in the view from the end portion on the +X side of the metal pipe 120, is named an oblique face 123. In the central lower part of the oblique face 123 formed is the upward opening 124 of the feedthrough hole 121. Further, the corner of the end portion on the –X side near the opening of the feedthrough hole 121 is chamfered in order not to damage the bundle of ribbon fibers 110 when external force acting in the direction of the Y-axis and/or the Z-axis is applied to the bundle of ribbon fibers 110 at this position.

Structures not mentioned above are the same as those of the optical fiber assembly having the hermetic seal portion 1 shown in FIG. 3 and FIG. 4, and like reference numerals as to those used in FIG. 3 and FIG. 4 are assigned to like members, omitting the description of each member. Besides, a flange 130 is a subsidiary member necessary to perform a helium leak test.

When the brazed portion 30 is formed in an inert gas (nitrogen) atmosphere, the metallized portion 112, of the bundle of ribbon fibers having the hermetic seal portion 101, disposed at least near the upward opening 124 in the feedthrough hole 121 is hermetically sealed to the metal pipe 120 by injecting solder wire through the upward opening 124 into the feedthrough hole 121 while is heated the upper and lower plane portions of the metal pipe 120 which covers the feedthrough hole 121 near the upward opening 124.

In the bundle of ribbon fibers having the hermetic seal portion 101, a plurality (for example, four fibers) of ribbon fibers 105 can be hermetically sealed in a lump to the only one metal pipe 120. When, for example, four optical fiber assemblies 10 are hermetically sealed to the conventional metal pipe 420, four metal pipes 420 are required to be used, because one metal pipe 420 must be used for each one optical fiber assembly 10. Further, since interference between one metal pipe 420 and the neighboring metal pipe 420 should be avoided, a size of a package is made larger than necessary. Still further, packaging operation takes much more time since four seal portions are necessary for sealing the metal pipe 420 to the package. However, by using the present bundle of ribbon fibers having the hermetic seal portion 101, these problems can be solved because a plurality of optical fiber assemblies 10 is hermetically sealed in a lump to the metal pipe 120.

Besides, in the second embodiment, a four-core optical fiber ribbon in which four optical fiber cores were disposed in parallel side by side was used as an example of the ribbon fiber 105, however the fiber is not exclusively limited thereto but an eight-core optical fiber ribbon in which eight optical fiber cores are disposed in parallel side by side or a twelve-core optical fiber ribbon in which twelve optical fiber cores are disposed in parallel side by side can also be employed.

Additionally, although a plurality of ribbon fibers 105 piled in two layers one on the other and placed in two rows side by side was used as an example of the bundle of ribbon fibers 110, it is not exclusively limited thereto but a plurality of ribbons only piled one on the other and/or a plurality of ribbons only placed side by side can be employed. Moreover, the number of layers and number of rows can be set to any number as the need arises.

(Third Embodiment)

Figure 14:
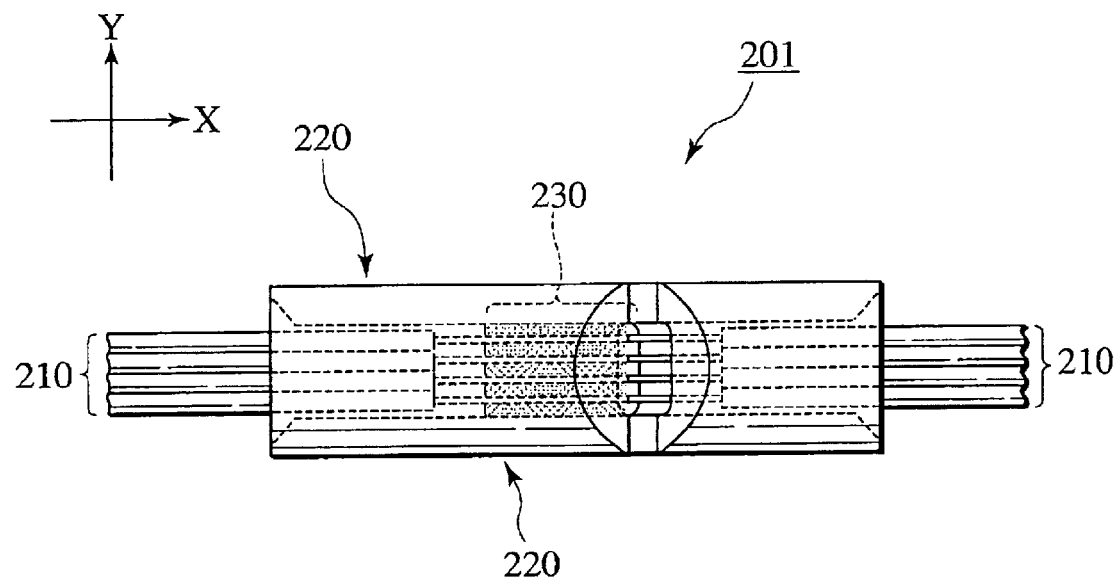
FIG. 14 is a plane view of an optical fiber assembly having a hermetic seal portion relating to the third embodiment of the present invention.
Figure 15:
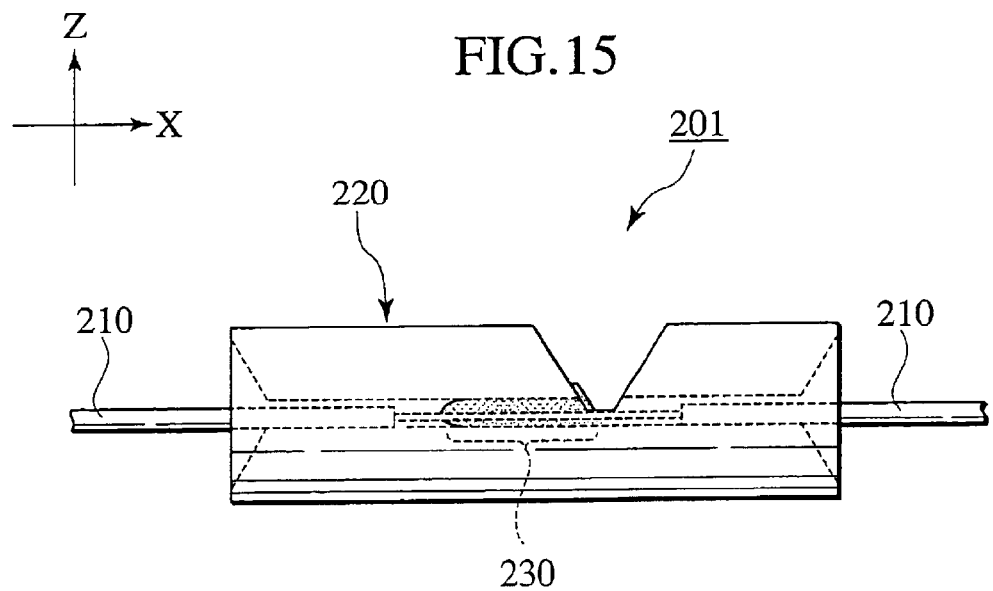
FIG. 15 is a front view of the optical fiber assembly having the hermetic seal portion relating to the third embodiment of the present invention.

As shown in FIG. 14 and FIG. 15, an optical fiber assembly having a hermetic seal portion 201 comprises an optical fiber assembly 210, a metal pipe (a hermetic connection component) 220 and a brazed portion 230. Further, the X-axis is set in the longitudinal direction of the metal pipe 220, the Y-axis in the width direction thereof and the Z-axis in the vertical direction thereof, respectively. The X-axis, Y-axis and Z-axis are perpendicular to one another.

The optical fiber assembly 210 is, for example, a four-core optical fiber ribbon in which four optical fiber cores are disposed in parallel side by side, comprising coated portions (resin-coated portions) 211a, 211b and a metallized portion (a metal-coated portion) 212 as shown in FIG. 16A and FIG. 16B. As shown in FIG. 16A, the metallized portion 212 is formed through coating with a metal (Ni/Au) a portion which has been exposed by peeling off a coating of the optical fiber assembly 210 by a prescribed length L at a distance from an end portion of the optical fiber assembly 210.

The metal pipe 220 has, as shown in FIG. 17A, a length equal to about twice the length L of the metallized portion 212 of the optical fiber assembly 210 in the longitudinal direction along the X-axis. A first feedthrough hole 221*a* extending from one end (on the −X side) of the metal pipe 220 has the length necessary to contain the major part of the metallized portion 212 when the metallized portion 212 of the optical fiber assembly 210 is disposed longitudinally in the central part of the metal pipe 220. Further, a portion between the first feedthrough hole 221*a* and a second feedthrough hole 221*b* extending from the other end (on the +X side) of the metal pipe 220 is in an uncovered state, and an uncovered portion 222 with the required length is formed there. An oblique face 223 is formed so as to slant in a direction coming close to the one end (on the −X side) of the metal pipe 220 at the boundary between the first feedthrough hole 221*a* and the uncovered portion 222. At the lower part of the oblique face 223 formed is the upward opening 224 of the first feedthrough hole 221*a*.

The shape of the metal pipe 220 will be described in detail in the following. The metal pipe 220 is, as shown in FIG. 17A, divided into five portions: a first cylinder portion 225, a first connection portion 226, a semi-cylinder portion 227, a second connection portion 228 and a second cylinder portion 229. The first cylinder portion 225 has a circular Y-Z cross section and is in the shape of a cylinder extending along X-axis, and includes the flat first feedthrough hole 221*a*, into which the optical fiber assembly 210 can be inserted, disposed along the X-axis in the central part of the first cylinder portion 225. The second cylinder portion 229 has a circular Y-Z cross section and is in the shape of a cylinder extending along X-axis, and includes the flat second feedthrough hole 221*b*, into which the optical fiber assembly 210 can be inserted, disposed along the X-axis in the central part of the second cylinder portion 229. The semi-cylinder portion 227 has a semi-circular Y-Z cross section and is in the shape of a semi-cylinder extending along the X-axis, and the uncovered portion 222 with a housing groove 250 leading to the first feedthrough hole 221*a* and the second feedthrough hole 221*b* and being able to contain the optical fiber assembly 210 is formed in the central part on the upper surface, parallel to the X-Y plane, of the semi-cylinder portion 227. Additionally, the semi-circle of the semi-cylinder portion 227 in the Y-Z cross section is equiform to a lower half of the circle of the first cylinder portion 225 in the Y-Z cross section and to that of the circle of the second cylinder portion 229 in the Y-Z cross section. Further, the semi-oblong of the housing groove 250 in the Y-Z cross section is equiform to a lower half of the oblong of the first feedthrough hole 221*a* in the Y-Z cross section and that of the oblong of the second feedthrough hole 221*b* in the Y-Z cross section. The first connection portion 226 is located between the first cylinder portion 225 and the semi-cylinder portion 227, and connects the edge 225*a* on the +X side of the first cylinder portion 225 smoothly to the edge 227*a* on the −X side of the semi-cylinder portion 227. In the central part of the connection portion 226, the first feedthrough hole 221*a* disposed in the central part of the first cylinder portion 225 extends along the X-axis. Further, as shown in FIG. 17B, the side of the first connection portion 226, which is not hidden by the semi-cylinder portion 227 in the view from the −X side of the semi-cylinder portion 227, is named the oblique face 223. In the central lower part of the oblique face 223, the upward opening 224 of the first feedthrough hole 221*a* is formed. Further, the corner of the end portion on the −X side near the opening of the first feedthrough hole 221*a* is chamfered in order not to damage the optical fiber assembly 210 when external force acting in the direction of the Y-axis and/or the Z-axis is applied to the optical fiber assembly 210 at this position. The second connection portion 228 is located between the second cylinder portion 229 and the semi-cylinder portion 227, and connects the edge 229*a* on the −X side of the second cylinder portion 229 smoothly to the edge 227*b* on the +X side of the semi-cylinder portion 227. In the central part of the second connection portion 228, the second feedthrough hole 221*b* disposed in the central part of the second cylinder portion 229 extends along the X-axis. Further, the corner of the end portion on the +X side near the opening of the second feedthrough hole 221*b* is chamfered in order not to damage the optical fiber assembly 210 when external force acting in the direction of the Y-axis and/or the Z-axis is applied to the optical fiber assembly 210 at this position.

The brazed portion 230 is a portion where the metallized portion 212 in the first feedthrough hole 221*a* is hermetically sealed, at least in the vicinity of the upward opening 224, to the metal pipe 220, as shown in FIG. 19A, by inserting solder through the upward opening 224 of the first feedthrough hole 221*a* to solder the metallized portion 212 within the first feedthrough hole 221*a*.

Next, a method for manufacturing the optical fiber assembly having the hermetic seal portion 201 will be described. First prepared are the optical fiber assembly 210 on which the metallized portion 212 having the a prescribed length L is formed at a distance from the end of the optical fiber assembly 210 as shown in FIG. 16A and FIG. 16B, and the metal pipe 220 in which the upward opening 224 is formed on a lower part of the oblique portion 223 formed at the boundary between the first feedthrough hole 221*a* and the housing groove 250 as shown in FIG. 17A, FIG. 17B and FIG. 17C.

Then, as shown in FIG. 18A, the optical fiber assembly 210 is inserted into the first feedthrough hole 221*a* and the second feedthrough hole 221*b* of the metal pipe 220 in order to set the metallized portion 212 in the longitudinally central portion of the metal pipe 220, and also a part of the remainder of the optical fiber assembly 210 is disposed in the housing groove 250 of the uncovered portion 222.

Next, the atmosphere surrounding the metal pipe 220 is replaced with an inert gas (for example, nitrogen).

In the inert gas atmosphere, the metallized portion 212 disposed at least near the upward opening 224 in the first feedthrough hole 221*a* is hermetically sealed to the metal pipe 220 as shown in FIG. 19A and FIG. 19B by injecting solder wire through the upward opening 224 into the first feedthrough hole 221*a* while the external surface of the metal pipe 220 covering the first feedthrough hole 221*a* near the upward opening 224, and preferably half or more of the external surface, is heated from both the opposite sides.

Thus, the metallized portion 212 of the optical fiber assembly 210 and the metal pipe 220 are hermetically sealed together, and further since the coated portion 211*a* which leads to the metallized portion 212 at the end portion on the −X side of the metal pipe 220 is contained within the first feedthrough hole 221*a* by sufficient length thereof, sufficient strength against bending can be possessed. Further, since the coated portion 211*b*, which leads to the metallized portion 212 at the end portion on the +X side of the metal pipe 220, is contained within the second feedthrough hole 221*b* by sufficient length thereof, sufficient strength against bending can also be possessed.

After solder has been injected, heating is stopped, and the metal pipe 220 is taken out from the inert atmosphere (nitrogen).

Figure 20:
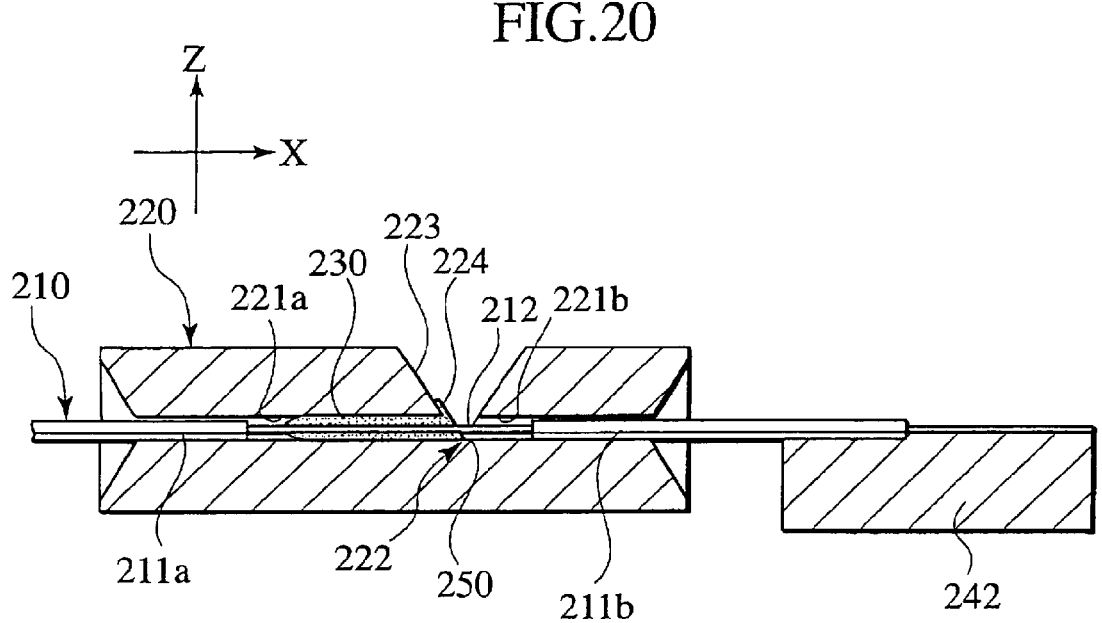
FIG. 20 is a front view in a vertical cross-section showing a state where a tip of the optical fiber assembly having a hermetic seal portion is fixed with an adhesive to a V-grooved array relating to the third embodiment of the present invention.

The top end of the optical fiber assembly having the hermetic seal portion 201 manufactured in such a manner is then exposed by peeling off the coated portion 211b of the optical fiber assembly 210, by the required length, extending in the +X direction from the end on the +X side of the metal pipe 220 as shown in FIG. 20, and the exposed part is made to adhere to a V-grooved array 242. The top end of the optical fiber assembly 210 is polished together with the V-grooved array 242.

Figure 21:
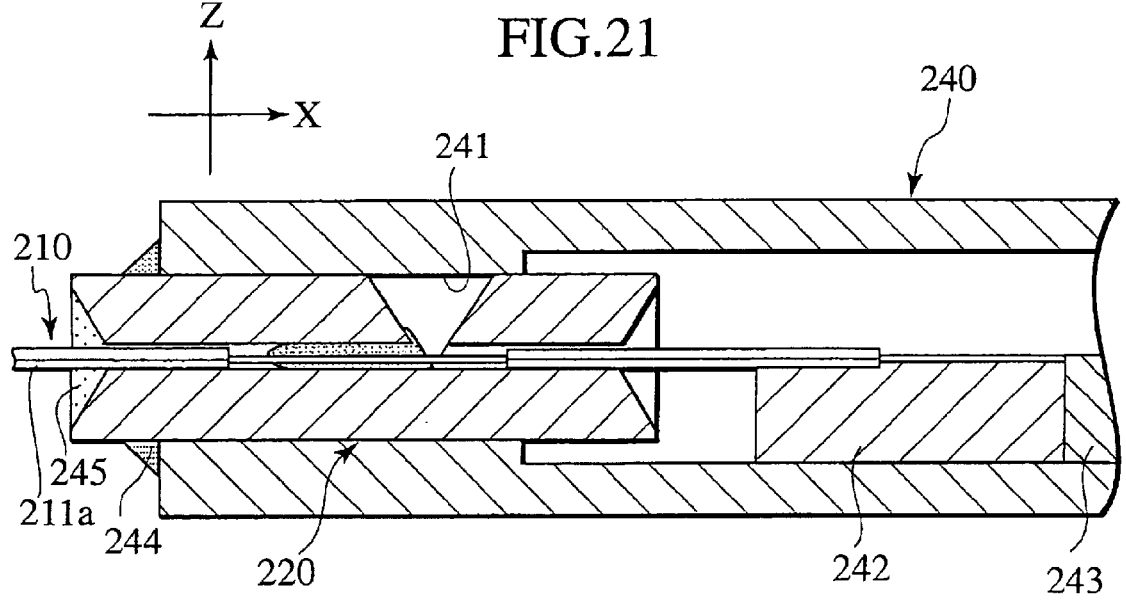
FIG. 21 is a front view in a vertical cross-section showing a state where a tip of the optical fiber assembly having a hermetic seal portion according to FIG. 20 is coupled with and fixed to a waveguide channel using an adhesive and then the metal pipe and a package are hermetically sealed and fixed using metal.

Next, as shown in FIG. 21, the metal pipe 220 is disposed in a feedthrough portion 241 of a package 240 of a parallel optical transmission module, and the top end of the optical fiber assembly 210 is bonded with an adhesive to a waveguide channel 243 disposed in the package 240. Then, the hermetic seal portion 244 is formed by hermetically sealing the metal pipe 220 and the package 240 outside the package 240 using metal, and the metal pipe 220 is fixed to the package 240. Further, if necessary, an adhesive-fixed portion 245 can be formed by fixing the opened end portion on the −X side of the metal pipe 220 and the coated portion 211a of the optical fiber assembly 210 together with an adhesive.

Since the optical fiber assembly having a hermetic seal portion 201 is composed as described above, it can be soldered without being stirred just as the metallized portion 212 of the optical fiber assembly 210 inserted into the first feedthrough hole 221a and the second feedthrough hole 221b is disposed substantially in the longitudinally central part of the metal pipe 220, and therefore, stable soldering can be achieved.

Further, the metallized portion 212 of the optical fiber assembly 210 and the metal pipe 220 can be hermetically sealed together with solder wire without using any particular solders such as a paste-like solder, a powder-like solder.

Further, a hermetic seal can be obtained using fluxless solder by injecting solder wire through the upward opening 224 into the first feedthrough hole 221a while the external surface of the metal pipe 220 covering the first feedthrough hole 221a near the upward opening 224 is heated in the inert gas (nitrogen) atmosphere without using any flux. Consequently, the manufacturing method is suitable to a method for hermetically sealing the optical fiber assembly 210 for which high reliability is required, because the method needs no flux removal after soldering and there are no unstable factors such as corrosion. Further, 80% Au/Sn solder with the melting point of 280° C. can be used as a fluxless solder with a high melting point.

Further, since the coated portions 211a and 211b leading to the metallized portion 212 of the optical fiber assembly 210 are disposed in the first feedthrough hole 221a and the second feedthrough hole 221b respectively, an adhesion process can be omitted in comparison with the case where the coated portion 211a or 211b is fixed to the metal pipe 220 using an adhesive (for example an epoxy adhesive). Still further, sufficient strength against bending can be possessed without fixing the coated portion 211a or 211b to the pipe 220 with an adhesive.

Through a helium leak test using the optical fiber assembly having the hermetic seal portion 201 manufactured according to the above-mentioned manufacturing method, it was determined that the value of the helium leakage was less than $1 \times 10^{-10}$ Pa·m³/sec.

Besides, in the third embodiment, a four-core optical fiber ribbon in which four optical fiber cores were disposed in parallel side by side was used as an example of the optical fiber assembly 210, however it is not exclusively limited thereto but an eight-core optical fiber ribbon in which eight optical fiber cores are disposed in parallel side by side or a twelve-core optical fiber ribbon in which twelve optical fiber cores are disposed in parallel side by side can also be employed.

Further, in the third embodiment, the length of the first feedthrough hole 221a was formed by the length which was necessary to contain at least the major part of the metallized portion 212, that is to say, the length which contained more than half of the metallized portion 212 as shown in FIG. 18A, when the metallized portion 212 was located substantially in the central part of the metal pipe 220. However, the length of the first feedthrough hole 221a is not exclusively limited thereto, but the length can be formed to any length, for example, from the length which may contain only part of the metallized portion 212 to the length which may contain almost all of the metallized portion 212.

Additionally, in the third embodiment, as shown in FIG. 17A, the oblique face of the second connection portion 228, which was not hidden by the semi-cylinder portion 227 viewing in the +X direction from the semi-cylinder portion 227, was formed so as to slant in the X-Z plane to the opposite side of the oblique face 223. However, the slanting is not exclusively limited thereto, but the oblique face of the second connection portion 228 can be formed in the appropriate shape such as a vertical face, a curved face as far as the following requirement is satisfied, considering what is required here is to form a space, between the oblique face 223 and the oblique face of the second connection portion 228, through which solder wire can be injected into the upward opening 224 of the first feedthrough hole 221a.

Further, in the third embodiment, no adhesion process with an adhesive was used in assembling the optical fiber assembly having the hermetic seal portion 201. However, the process is not exclusively limited thereto, but if necessary the metallized portion 212 (in a certain case, including a part of the coated portion 211b) exposed on the uncovered portion 222, for example, can be fixed to the metal pipe 220 using an appropriate adhesive (for example, an epoxy adhesive).

Still, further, in the third embodiment as shown in FIG. 20 and FIG. 21, the top end of the optical fiber assembly 210 was exposed by peeling off coating of the optical fiber assembly 210, by the required length, extending in the +X direction from the metal pipe 220, and the exposed part was made to adhere to the V-grooved array 242, and then the metal pipe 220 and the package 240 were hermetically sealed and fixed together with metal after the top end was bonded with the adhesive to the waveguide channel 243. However, the process is not exclusively limited thereto, for instance, it is possible that the top end of the optical fiber assembly 210 may be exposed by peeling off the coating of the optical fiber assembly 210, by a required length, extending not in the +X direction but in the −X direction from the metal pipe 220, and the exposed part may be made to adhere to the V-grooved array 242, and then the metal pipe 220 and the package 240 may be hermetically sealed and fixed together with metal after the top end may have been bonded with an adhesive to the waveguide channel 243.

(Fourth Embodiment)

Figure 22:
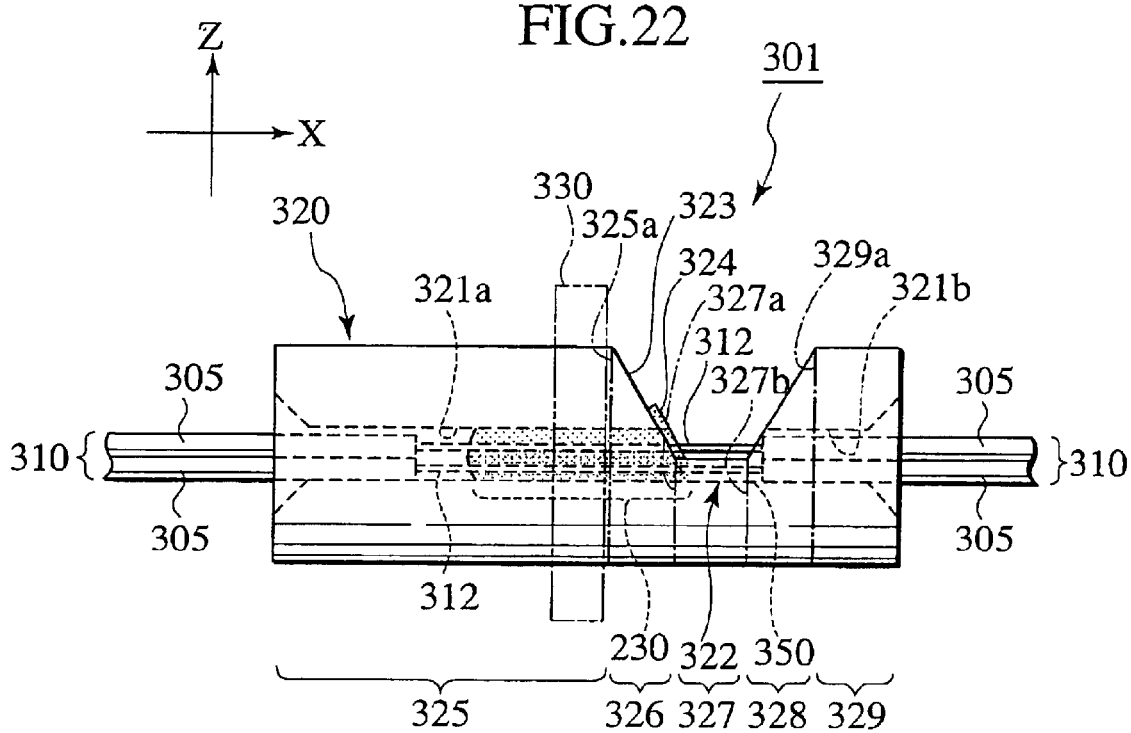
FIG. 22 is a front view of a bundle of ribbon fibers having a hermetic seal portion relating to the fourth embodiment of the present invention.
Figure 23:
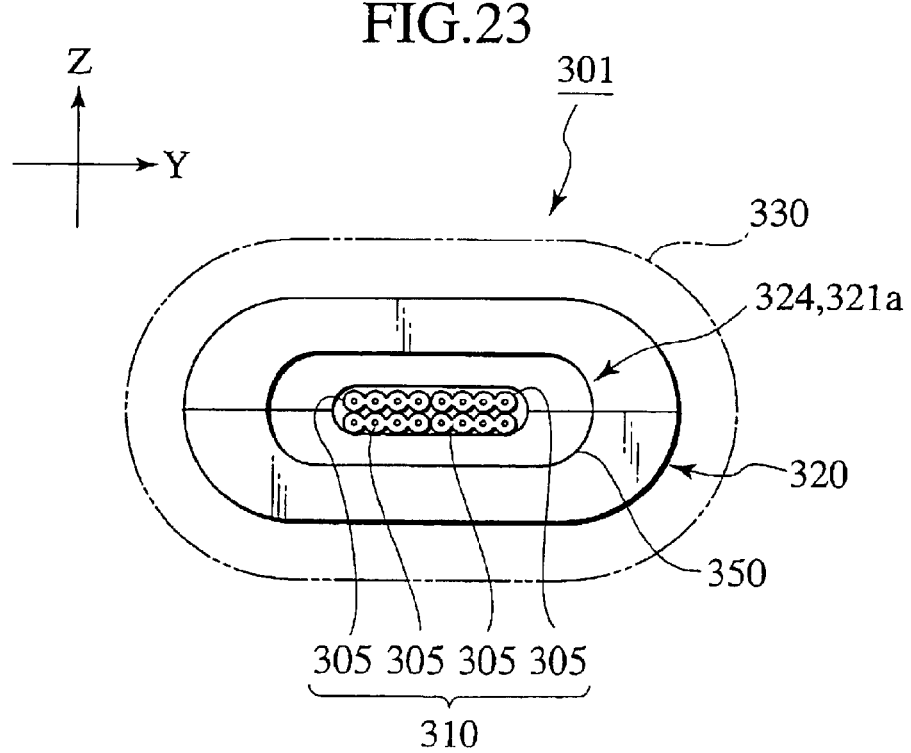
FIG. 23 is a side view of the bundle of ribbon fibers having the hermetic seal portion relating to the fourth embodiment of the present invention.

As shown in FIG. 22 and FIG. 23, a bundle of ribbon fibers having a hermetic seal portion 301 comprises a bundle of ribbon fibers 310, a metal pipe (a hermetic connection component) 320 and a brazed portion 230. Besides, the X-axis is set in the longitudinal direction of the metal pipe 320, the Y-axis in the width direction thereof and the Z-axis in the vertical direction thereof, respectively. The X-axis, Y-axis and Z-axis are perpendicular to one another.

The bundle of ribbon fibers having a hermetic seal portion 301 deals with the bundle of ribbon fibers 310 consisting of a plurality (four ribbons) of ribbon fibers 305 (for example, the ribbon fiber 305 is a four-core optical fiber ribbon in which four optical fiber cores are disposed in parallel side by side) piled one on the other in multi-layers (for example, two layers) and placed side by side in rows (for example, two rows). Further the bundle of ribbon fibers 310 comprises a metallized portion (a metal-coated region) 312 and coated portions (resin-coated regions).

The shape of the metal pipe 320 will be described in detail in the following. The metal pipe 320 is, as shown in FIG. 22, divided into five portions: a first ellipse column portion 325, a first connection portion 326, a semi-ellipse column portion 327, a second connection portion 328 and a second ellipse column portion 329. The first ellipse column portion 325 has a flat elliptic Y-Z cross section and is in the shape of a nearly elliptic column extending along X-axis, and includes the flat first feedthrough hole 321a, into which the bundle of ribbon fibers 310 can be inserted, disposed along the X-axis in the central part of the first ellipse column portion 325. The second ellipse column portion 329 has a flat elliptic Y-Z cross section and is in the shape of a nearly elliptic column extending along X-axis, and includes the flat second feedthrough hole 321b, into which the bundle of ribbon fibers 310 can be inserted, disposed along the X-axis in the central part of the second ellipse column portion 329. The semi-ellipse column portion 327 has a flat semi-elliptic Y-Z cross section and is in the shape of a nearly semi-elliptic column extending along the X-axis, and the uncovered portion 322 with a housing groove 350, leading to the first feedthrough hole 321a and the second feedthrough hole 321b, in which the bundle of ribbon fibers 310 can be contained is formed in the central part on the upper surface, parallel to the X-Y plane, of the semi-ellipse column portion 327. Additionally, the nearly semi-elliptic shape of the semi-ellipse column portion 327 in the Y-Z cross section is equiform to a lower half of the nearly elliptic shape of the first ellipse column portion 325 in the Y-Z cross section and to that of the nearly elliptic shape of the second ellipse column portion 329 in the Y-Z cross section. Further, the semi-oblong of the housing groove 350 in the Y-Z cross section is equiform to a lower half of the oblong of the first feedthrough hole 321a in the Y-Z cross section and to that of the oblong of the second feedthrough hole 321b in the Y-Z cross section. The first connection portion 326 is located between the first ellipse column portion 325 and the semi-ellipse column portion 327, and connects the edge 325a on the +X side of the first ellipse column portion 325 smoothly to the edge 327a on the −X side of the semi-ellipse column portion 327. In the central part of the first connection portion 326, the first feedthrough hole 321a disposed in the central part of the first ellipse column portion 325 extends along the X-axis. Further, as shown in FIG. 23, the side of the first connection portion 326, which is not hidden by the semi-ellipse column portion 327 viewing in the −X direction from the semi-ellipse column portion 327, is named an oblique face 323. In the central lower part of the oblique face 323, the upward opening 324 of the first feedthrough hole 321a is formed. Further, the corner of the end portion on the −X side near the opening of the first feedthrough hole 321a is chamfered in order not to damage the bundle of ribbon fibers 310 when external force acting in the direction of the Y-axis and/or the Z-axis is applied to the bundle of ribbon fibers 310 at this position. The second connection portion 328 is located between the second ellipse column portion 329 and the semi-ellipse column portion 327, and connects the edge 329a on the −X side of the second ellipse column portion 329 smoothly to the edge 327b on the +X side of the semi-ellipse column portion 327. In the central part of the second connection portion 328, the second feedthrough hole 321b disposed in the central part of the second ellipse column portion 329 extends along the X-axis. Further, the corner of the end portion on the +X side near the opening of the second feedthrough hole 321b is chamfered in order not to damage the bundle of ribbon fibers 310 when external force acting in the direction of the Y-axis and/or the Z-axis is applied to the bundle of ribbon fibers 310 at this position.

Structures not mentioned above are the same as those of the optical fiber assembly having the hermetic seal portion 201 shown in FIG. 14 and FIG. 15, and the same reference numerals to those used in FIG. 14 and FIG. 15 are assigned to like members, omitting the description of each member. Besides, a flange 330 is a subsidiary member necessary to perform a helium leak test.

When the brazed portion 230 is formed in an inert gas (nitrogen) atmosphere, the metallized portions 312, of the bundle of ribbon fibers having the hermetic seal portion 301, disposed at least near the upward opening 324 in the first feedthrough hole 321a are hermetically sealed to the metal pipe 320 by injecting solder wire through the upward opening 324 into the first feedthrough hole 321a while the upper and lower plane portions of the metal pipe 320 which cover the first feedthrough hole 321a near the upward opening 324 are heated.

In the bundle of ribbon fiber having the hermetic seal portion 301, a plurality (for example, four fibers) of ribbon fibers 305 can be hermetically sealed in a lump to the only one metal pipe 320. When, for example, four optical fiber assemblies 210 are hermetically sealed to the conventional metal pipe 420, four metal pipes 420 are required to be used, because one metal pipe 420 must be used for each optical fiber assembly 210. Further, since interference between one metal pipe 420 and the neighboring metal pipe 420 should be avoided, a size of a package is made larger than necessary. Still further, packaging operation takes much more time since four seal portions are necessary for sealing the metal pipe 420 to the package. However, by using the present bundle of ribbon fibers having the hermetic seal portion 301, these problems can be solved because a plurality of optical fiber assemblies 210 are hermetically sealed in a lump to the metal pipe 320.

Besides, in the fourth embodiment, a four-core optical fiber ribbon in which four optical fiber cores were disposed in parallel side by side was used as an example of the ribbon fiber 305, however the fiber is not exclusively limited thereto but an eight-core optical fiber ribbon in which eight optical fiber cores are disposed in parallel side by side or a twelve-core optical fiber ribbon in which twelve optical fiber cores are disposed in parallel side by side can also be employed.

Additionally, in the fourth embodiment, although a plurality of ribbon fibers 305 piled in two layers one on the other and placed in two rows side by side was used as an example of the bundle of ribbon fibers 310, it is not exclusively limited thereto but a plurality of ribbons only piled one on the other and/or a plurality of ribbons only placed side by side can be employed, and moreover, the number of layers and number of rows can be set to any number as the need arises.

What is claimed is:

1. An optical fiber assembly having a hermetic seal portion for the use of a parallel optical transmission module comprising:
    an optical fiber assembly including a metal-coated portion where a portion exposed by peeling off resin coating by a prescribed length at a distance from end portions thereof is coated with metal;
    a hermetic connection component having:
        a feedthrough hole which extends from one end of the component for covering at least a part of the metal-coated portion of the optical fiber assembly;
        a housing groove to be open in an uncovered state which leads to the feedthrough hole and extends to the other end of the component for containing the remainder of the metal coated portion of the optical fiber assembly; and
        an upward opening formed so as to slant in a direction coming close to the one end of the component at the boundary between the feedthrough hole and the housing groove,
        wherein the component is made of metal and has a length equal to the sum of the length of the metal-coated portion of the optical fiber assembly plus the required length of the resin-coated portions leading to both sides of the metal-coated portion;
    a brazed portion where at least the metal-coated portion near the upward opening within the feedthrough hole is hermetically sealed to the hermetic connection component by brazing through the upward opening of the hermetic connection component; and
    an adhesive-fixed portion where at least parts of the resin-coated portion as well as the metal-coated portion exposed on the housing groove are fixed with an adhesive to the hermetic connection component.

2. The optical fiber assembly having the hermetic seal portion according to claim 1, wherein the feedthrough hole extending from the one end of the hermetic connection component has a length necessary to cover the major part of the metal-coated portion of the optical fiber assembly.

3. The optical fiber assembly having the hermetic seal portion according to claim 1, wherein the brazed portion is hermetically sealed by fluxless solder.

4. The optical fiber assembly having the hermetic seal portion according to claim 1, wherein the optical fiber assembly is a bundle of ribbon fibers taking at least one of arrangements of piling up the ribbon fibers and of placing the ribbon fibers side by side.

5. The optical fiber assembly having the hermetic seal portion according to claim 1, wherein the hermetic connection component comprises a cylinder portion in the shape of a cylinder, a semi-cylinder portion in the shape of a semi-cylinder and a connection portion connecting an edge of the cylinder portion to an edge of the semi-cylinder; the feedthrough hole is formed in the central part along the longitudinal direction of the cylinder portion and the connection portion; the housing groove is formed in the central part on a plane side along the longitudinal direction of the semi-cylinder portion; and the upward opening is formed in the central lower part of an oblique face of the connection portion so as to slant in the direction coming close to the cylinder portion.

6. A method for manufacturing an optical fiber assembly having a hermetic seal portion by inserting the optical fiber assembly into a feedthrough hole of a hermetic connection component to seal hermetically, wherein the optical fiber assembly includes a metal-coated portion where a portion exposed by peeling off resin coating by a prescribed length at a distance from end portions thereof is coated with metal, the hermetic connection component has the feedthrough hole which extends from one end of the component for covering at least a part of the metal-coated portion of the optical fiber assembly, a housing groove to be open in an uncovered state which leads to the feedthrough hole and extends to the other end of the component for containing the remainder of the metal coated portion of the optical fiber assembly, and an upward opening formed so as to slant in a direction coming close to the one end of the component at the boundary between the feedthrough hole and the housing groove, further, the component is made of metal and has a length equal to the sum of the length of the metal-coated portion of the optical fiber assembly plus the required length of the resin-coated portions leading to both sides of the metal-coated portion, the method comprising the steps of:
    positioning the metal-coated portion substantially in the center of the hermetic connection component through inserting the optical fiber assembly into the feedthrough hole of the hermetic connection component;
    replacing an atmosphere surrounding the hermetic connection component with an inert gas;
    sealing hermetically the metal-coated portion in the feedthrough hole at least near the upward opening to the hermetic connection component by heating the hermetic connection component and by injecting solder into the upward opening; and further
    fixing at least parts of the resin-coated portion as well as the metal-coated portion exposed on the housing groove with an adhesive to the hermetic connection component.

7. The method for manufacturing the optical fiber assembly having the hermetic seal portion according to claim 6, wherein an external surrounding of the feedthrough hole is heated in the vicinity of the upward opening of the hermetic connection component during the injection of solder into the upward opening in the inert atmosphere.

8. The method for manufacturing the optical fiber assembly having the hermetic seal portion according to claim 6, wherein the optical fiber assembly is a bundle of ribbon fibers taking at least one of arrangements of piling up the ribbon fibers and of placing the ribbon fibers side by side.

9. An optical fiber assembly having a hermetic seal portion for the use of a parallel optical transmission module comprising:
    an optical fiber assembly including a metal-coated portion where a portion exposed by peeling off resin coating by a prescribed length at a distance from end portions thereof is coated with metal;
    a hermetic connection component having:
        a feedthrough hole divided into a first feedthrough hole which extends from one end of the component for covering at least a part of the metal-coated portion of the optical fiber assembly and a second feedthrough hole which extends from the other end of the component;
        an housing groove to be open in an uncovered state which leads to the first feedthrough hole and the second feedthrough hole; and
        an upward opening formed so as to slant in a direction coming close to the one end of the component at the boundary between the first feedthrough hole and the housing groove,
        wherein the component is made of metal and has a length equal to the sum of the length of the metal-coated portion of the optical fiber assembly plus the required length of the resin-coated portions leading to both sides of the metal-coated portion, and a brazed portion where the metal-coated portion at least near the upward opening within the frist feedthrough hole is hermetically sealed to the hermetic connection component by brazing through the upward opening of the hermetic connection component.

10. The optical fiber assembly having the hermetic seal portion according to claim 9, wherein the first feedthrough hole extending from the one end of the hermetic connection component has the length necessary to cover the major part of the metal-coated portion of the optical fiber assembly.

11. The optical fiber assembly having the hermetic seal portion according to claim 9, wherein the brazed portion is hermetically sealed by fluxless solder.

12. The optical fiber assembly having the hermetic seal portion according to claim 9, wherein the optical fiber assembly is a bundle of ribbon fibers taking at least one of the arrangements of piling up the ribbon fibers and of placing the ribbon fibers side by side.

13. The optical fiber assembly having the hermetic seal portion according to claim 9, wherein, the hermetic connection component comprises a first cylinder portion in the shape of a cylinder, a second cylinder portion in the shape of a cylinder, a semi-cylinder portion in the shape of a semi-cylinder, a first connection portion connecting an edge of the first cylinder portion to one edge of the semi-cylinder and a second connection portion connecting an edge of the second cylinder portion to the other edge of the semi-cylinder; the first feedthrough hole is formed in the central part along the longitudinal direction of the first cylinder portion and the first connection portion; the second feedthrough hole is formed in the central part along the longitudinal direction of the second cylinder portion and the second connection portion; the housing groove is formed in the central part on a plane side along the longitudinal direction of the semi-cylinder portion; and the upward opening is formed in the central lower part of an oblique face of the first connection portion so as to slant in the direction coming close to the first cylinder portion.

14. A method for manufacturing an optical fiber assembly having a hermetic seal portion by inserting the optical fiber assembly into a feedthrough hole of a hermetic connection component to seal hermetically, wherein the optical fiber assembly includes a metal-coated portion where a portion exposed by peeling off resin coating by a prescribed length at a distance from an end portion thereof is coated with metal, the hermetic connection component has the feedthrough hole divided into a first feedthrough hole which extends from one end of the component for covering at least a part of the metal-coated portion of the optical fiber assembly and a second feedthrough hole which extends from the other end of the component, an housing groove to be open in an uncovered state which leads to the first feedthrough hole and the second feedthrough hole, and an upward opening formed so as to slant in a direction coming close to the one end of the component at the boundary between the first feedthrough hole and the housing groove, wherein the component is made of metal and has a length equal to the sum of the length of the metal-coated portion of the optical fiber assembly plus the required length of the resin-coated portions leading to both sides of the metal-coated portion, the method comprising the steps of:

positioning the metal-coated portion substantially in the center of the hermetic connection component through inserting the optical fiber assembly into the first and second feedthrough holes of the hermetic connection component;

replacing an atmosphere surrounding the hermetic connection component with an inert gas; and sealing hermetically the metal-coated portion in the first feedthrough hole at least near the upward opening to the hermetic connection component by heating the hermetic connection component and by injecting solder into the upward opening.

15. The method for manufacturing the optical fiber assembly having the hermetic seal portion according to claim 14, wherein an external surrounding of the first feedthrough hole is heated in the vicinity of the upward opening of the hermetic connection component during the injection of solder into the upward opening in the inert atmosphere.

16. The method for manufacturing the optical fiber assembly having the hermetic seal portion according to claim 14, wherein the optical fiber assembly is a bundle of ribbon fibers taking at least one of the arrangements of piling up the ribbon fibers and of placing the ribbon fibers side by side.

* * * * *